US010325485B1

(12) United States Patent
Schuster

(10) Patent No.: US 10,325,485 B1
(45) Date of Patent: Jun. 18, 2019

(54) SYSTEM OR PROCESS TO DETECT, DISCRIMINATE, AGGREGATE, TRACK, AND RANK SAFETY RELATED INFORMATION IN A COLLABORATIVE WORKSPACE

(71) Applicant: Rockwell Automation Technologies, Inc., Mayfield Heights, OH (US)

(72) Inventor: George Karl Schuster, Royal Oak, MI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/127,629

(22) Filed: Sep. 11, 2018

(51) Int. Cl.
*G08B 31/00* (2006.01)
*G08B 21/18* (2006.01)
*G08B 21/02* (2006.01)
*G01S 17/89* (2006.01)

(52) U.S. Cl.
CPC ............ *G08B 31/00* (2013.01); *G08B 21/02* (2013.01); *G08B 21/187* (2013.01); *G01S 17/89* (2013.01)

(58) Field of Classification Search
CPC ...... G08B 31/00; G08B 21/02; G08B 21/187; G01S 17/89
See application file for complete search history.

(56) References Cited

U.S. PATENT DOCUMENTS

| | | | |
|---|---|---|---|
| 5,253,190 A | 10/1993 | Srinivasan | |
| 5,340,992 A | 8/1994 | Matsugu et al. | |
| 5,561,760 A | 10/1996 | Ferris et al. | |
| 5,602,761 A | 2/1997 | Spoerre et al. | |
| 6,173,280 B1 | 1/2001 | Ramkumar et al. | |
| 6,735,630 B1 | 5/2004 | Gelvin et al. | |
| 6,895,102 B2 | 5/2005 | Lewins et al. | |
| 7,313,502 B2 | 12/2007 | Schuster et al. | |
| 9,771,225 B2 * | 9/2017 | Stone | B65G 69/00 |
| 10,019,881 B2 * | 7/2018 | Chung | H04W 4/90 |
| 2003/0186461 A1 | 10/2003 | Baehr et al. | |
| 2003/0186663 A1 | 10/2003 | Chen et al. | |

(Continued)

OTHER PUBLICATIONS

Office Action for U.S. Appl. No. 11/360,539 dated Apr. 19, 2007, 14 pages.

*Primary Examiner* — Mohamed Barakat
(74) *Attorney, Agent, or Firm* — Amin, Turocy & Watson, LLP

(57) ABSTRACT

An industrial safety system implements predictive method of detecting possible hazardous interactions between humans and machines or other hazardous entities. The system receives sensor data indicative of the locations of people and hazardous entities within the plant environment. Sensor data corresponding to each detected entity is aggregated, ranked, and weighed based on determined reliabilities of the respective data sources. The resulting ranked and weighed location information is tracked and analyzed by the system to determine current and predicted trajectories of the detected objects, and the system analyzes these trajectories to determine a probability of a future hazardous interaction between a human and a hazardous entity. In response to determining that a likelihood of a future hazardous interaction between a person and a machine exists, the system delivers a control output that places the machine in a safe state or a notification output warning of the hazard.

20 Claims, 18 Drawing Sheets

(56) References Cited

U.S. PATENT DOCUMENTS

| | | | |
|---|---|---|---|
| 2005/0155429 A1 | 7/2005 | Griessler et al. | |
| 2006/0009941 A1 | 1/2006 | Motz et al. | |
| 2011/0234374 A1* | 9/2011 | Insley | A41D 13/00 340/10.1 |
| 2013/0282280 A1* | 10/2013 | Patterson | G08B 7/062 701/533 |
| 2015/0070479 A1* | 3/2015 | Yu | G09B 21/003 348/62 |
| 2018/0233019 A1* | 8/2018 | Werronen | G08B 25/016 |
| 2018/0315301 A1* | 11/2018 | Subramanian | G06K 9/6278 |

* cited by examiner

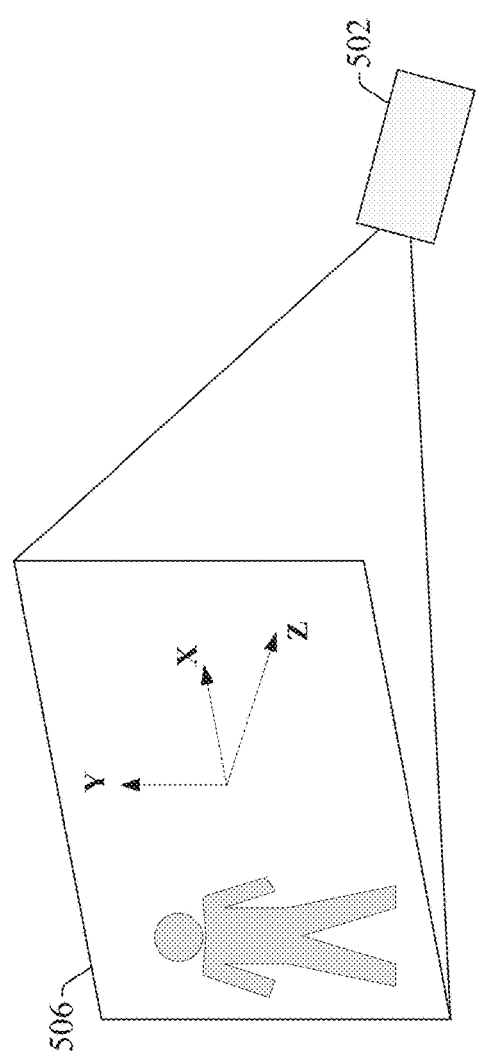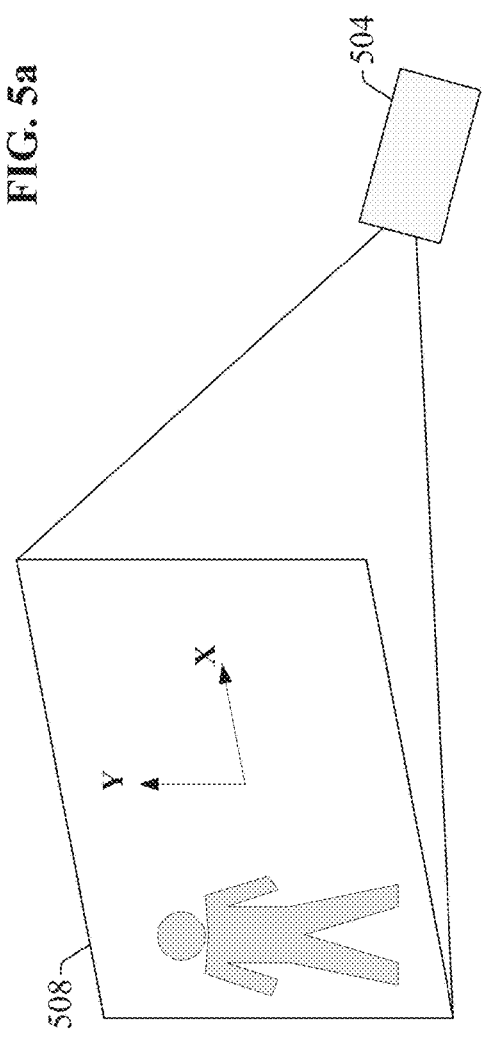

SYSTEM OR PROCESS TO DETECT, DISCRIMINATE, AGGREGATE, TRACK, AND RANK SAFETY RELATED INFORMATION IN A COLLABORATIVE WORKSPACE

BACKGROUND

The subject matter disclosed herein relates generally to industrial safety, and, for example, to mitigation of hazardous or potentially damaging interactions within a monitored industrial area.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, an industrial safety system is provided, comprising an input device interface component configured to receive sensor data from industrial sensor devices, wherein the sensor data represents monitored characteristics of an industrial area; an object detection component configured to identify, based on analysis of the sensor data, entities that are present within the industrial area, and to classify the entities according to two or more classifications, wherein the two or more classifications comprise at least a human entity and a hazardous entity; a weighing component configured to, for each subset of the sensor data corresponding to an entity of the entities, apply a weight value to the subset of the sensor data indicative of a determined reliability of the subset of the sensor data to yield weighed sensor data; a vector generation component configured to, for each entity of the entities, aggregate subsets of the weighed sensor data corresponding to the entity to determine a measured trajectory of the entity within the industrial area, predict one or more future trajectories of the entity based on analysis of the measured trajectory and one or more constraints of the entity defined by characteristic constraint data, and combine the measured trajectory and the one or more future trajectories to yield vector data for the entity; a hazard analysis component configured to, based on analysis of first vector data corresponding to a first entity of the entities and second vector data corresponding to a second entity of the entities, predict a future hazardous interaction between the first entity and the second entity; and an industrial device interface component configured to, in response to a determination that the future hazardous interaction satisfies a defined criterion, generate a control output signal directed to a device in the industrial area, wherein the control output signal is configured to at least one of notify at least one of the first entity or the second entity of the hazardous interaction or to modify a controlled behavior of at least one of the first entity or the second entity to mitigate the hazardous interaction.

Also, one or more embodiments provide a method for mitigating predicted industrial hazards, comprising receiving, by a system comprising a processor, sensor data from industrial sensor devices that monitor for presence of entities within an industrial area; identifying, by the system based on an analysis of the sensor data, entities that are present within the industrial area; classifying, by the system, the entities according to two or more classifications, wherein the two or more classifications comprise at least a human entity and a hazardous entity; applying, by the system for each subset of the sensor data corresponding to an entity of the entities, a weight value to the subset of the sensor data representing a determined accuracy of the subset of the sensor data to yield weighed sensor data; for each entity of the entities: determining, by the system, a measured trajectory of the entity within the industrial area based on an aggregation of subsets of the weighted sensor data corresponding to the entity; predicting, by the system, one or more future trajectories of the entity based on analysis of the measured trajectory and one or more constraints of the entity defined by characteristic constraint data; and combining, by the system, the measured trajectory and the one or more future trajectories to yield vector data for the entity; predicting, by the system, a future hazardous interaction between a first entity of the entities and a second entity of the entities based on analysis of first vector data corresponding to the first entity and second vector data corresponding to the second entity; and in response to determining that the future hazardous interaction satisfies a defined criterion, generating, by the system, a control output signal directed to a device in the industrial area, wherein the control output signal is configured to at least one of notify at least one of the first entity or the second entity of the hazardous interaction or to initiate a change of a controlled behavior of at least one of the first entity or the second entity to mitigate the hazardous interaction.

Also, according to one or more embodiments, a non-transitory computer-readable medium is provided having stored thereon instructions that, in response to execution, cause a system comprising a processor to perform operations, the operations comprising receiving, from industrial sensor devices, sensor data representing monitored characteristics of an industrial area; identifying, based on an analysis of the sensor data, entities within the industrial area; classifying the entities according to at least two classifications, wherein the at least two classifications comprise at least a human entity and a hazardous entity; for each subset of the sensor data corresponding to an entity of the entities, assigning a weight value to the subset of the sensor data to yield weighed sensor data, the weight value representing a determined reliability of the subset of the sensor data; for each entity of the entities: aggregating subsets of the weight sensor data corresponding to the entity to yield a measured trajectory of the entity within the industrial area; predicting one or more future trajectories of the entity based on analysis of the measured trajectory and one or more constraints of the entity defined by characteristic constraint data; and combining the measured trajectory and the one or more future trajectories to yield vector data for the entity; predicting a future hazardous interaction between a first entity of the entities and a second entity of the entities based on analysis of first vector data corresponding to the first entity and second vector data corresponding to the second entity; and in response to determining that the future hazardous interaction satisfies a defined criterion, generating a control output signal directed to a device within the industrial area, wherein the control output signal is configured to at least one of notify at least one of the first entity or the second entity of the hazardous interaction or to alter a controlled behavior of at least one of the first entity or the second entity to mitigate the hazardous interaction.

To the accomplishment of the foregoing and related ends, certain illustrative aspects are described herein in connection with the following description and the annexed drawings. These aspects are indicative of various ways which can be

BRIEF DESCRIPTION OF THE DRAWINGS

FIG. 5a is a schematic illustrating 3D image analysis of an image using a 3D image sensor.

FIG. 5b is a schematic illustrating 2D image analysis of an image using a 2D image sensor.

DETAILED DESCRIPTION

Figure 1:
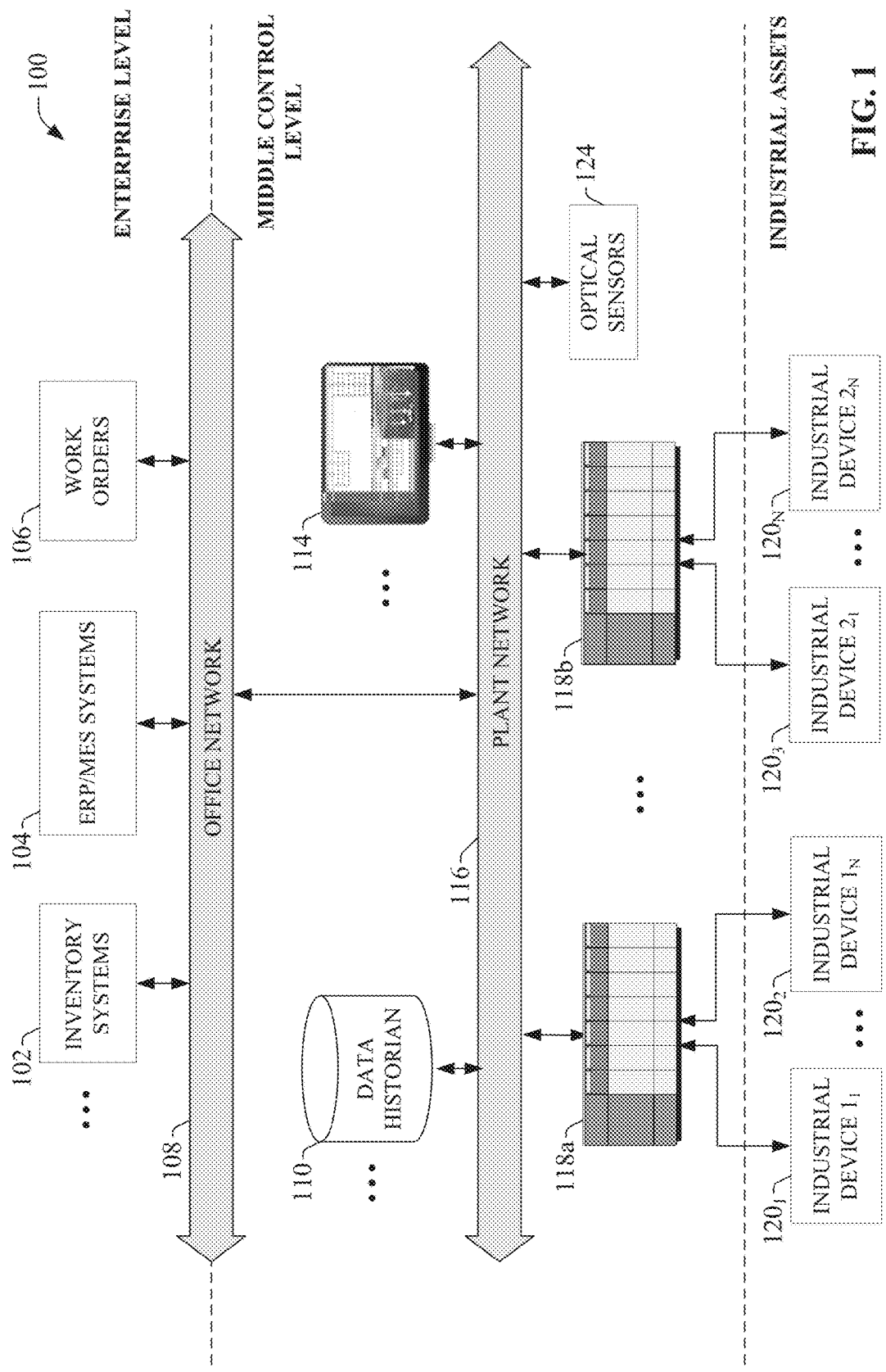
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Other systems may also reside within the plant environment, including but not limited to data historians 110 that aggregate and store production information collected from the industrial controllers 118 or other data sources, inventory tracking systems 102, a work order management systems 106, enterprise resource planning (ERP) or manufacturing execution systems (MES) 104, or other such systems.

Industrial environments can also include various types of sensors that detect the presence and/or location of people and objects (e.g., parts, vehicles, machine components, etc.) within the plant. These sensors can include proximity sensors, photo-detectors, optical sensors 124 such as three-dimensional imaging sensors (e.g., time-of-flight, or TOF, cameras), laser scanners, or other such sensors. Some of these sensors may be interfaced with one or more of the industrial controllers 118, while others (e.g., optical sensor 124 depicted in FIG. 1) may operate independently of the industrial controllers. For example, some sensors may include their own I/O for directly interfacing with a machine, or may interface with a machine or controller 118 via plant network 116.

Industrial environments can be viewed as collaborative workspaces in which people and equipment are moving within the same space at the same time. To minimize the risk of injury due to unsafe interactions between humans and industrial assets during operation, plant engineers typically implement safety systems to protect operators and other personnel who interact with operating machinery. These safety systems often include a safety relay or controller that monitors the states of various safety input devices, and disconnects power to hazardous machine components if any of the safety input devices indicate a potentially unsafe condition. An example safety input device may comprise a proximity switch installed on a safety gate that provides access to a hazardous machine. The proximity switch output may be provided as an input to the safety relay, which operates a contactor to isolate power from the machine when the proximity switch indicates that the safety gate is open. Thus, the safety system de-energizes the machine when a user attempts to enter the safety gate, causing production to cease and rendering the machine safe. Other example safety input devices can include, but are not limited to, emergency stop pushbuttons, industrial safety mats that detect human presence based on weight detection, emergency pull-cord devices, photoelectric sensors, optical sensors (e.g., TOF cameras, laser-based sensors, etc.) or other such safety detection devices.

Industrial safety systems are typically designed to de-energize or otherwise stop a hazardous machine in response to simple human presence detection (e.g., when a safety gate is opened, when a safety mat is triggered, when a beam from a light curtain or other type of photo-detector is broken, etc.). Since industrial safety systems are designed to heavily prioritize the safety of human operators over continuous machine operation, these systems typically implement a low threshold for human detection, which can result in unnecessarily frequent machine stoppages even in scenarios in which there is no danger of hazardous interaction between a person and a machine. These frequent unnecessary machine stoppages can adversely impact overall machine output or throughput.

To address these and other issues, one or more embodiments of the present disclosure provide an industrial safety system that implements a comprehensive predictive method of detecting possible hazardous interactions between humans and machines. In one or more embodiments, the industrial safety system can receive sensor data from multiple sensors on the plant floor, where the sensor data is indicative of the locations and/or movement of people and objects within the plant environment. This sensor data can be obtained from a variety of sources, including but not limited to TOF cameras, two-dimensional imagine sensors, photo-detectors, laser scanners, or other such sensors. Sensor data corresponding to one or more detected objects or people can be aggregated, ranked, and weighed by the system based on determined reliabilities of the respective data sources. The resulting ranked and weighed object and human location/movement information can be tracked and analyzed by the system to determine current and predicted trajectories of the detected objects, and the system can analyze these trajectories to determine a probability of a future hazardous interaction between a human and a machine, or a potentially damaging future interaction between two machines (e.g., between two industrial machines, between two vehicles, between a machine and a vehicle, etc.). In response to determining that a likelihood of a future hazardous interaction between a person and a machine (or a damaging interaction between two machines) exists, the system can deliver a control output that places the machine in a safe state (e.g., by removing power from the machine, placing the machine in a safe mode, etc.). The sophisticated hazard detection techniques implemented by embodiments of the industrial safety system described herein can maintain reliable machine safety while reducing the number of unnecessary machine stoppages (and corresponding accumulated machine downtime) that would otherwise occur when simpler human detection techniques are used.

Embodiments of the systems and methods described herein are not limited to predictive tracking of machinery or parts for hazard detection purposes. Rather, the predictive tracking and hazard detection techniques described herein can also be used to identify dangerous interactions between humans and other types of hazardous entities or events, including hazards relating to diffusion of harmful gases or other contaminants, radiation, fire or explosions, hazardous noise levels, or other types of hazards.

Figure 2:
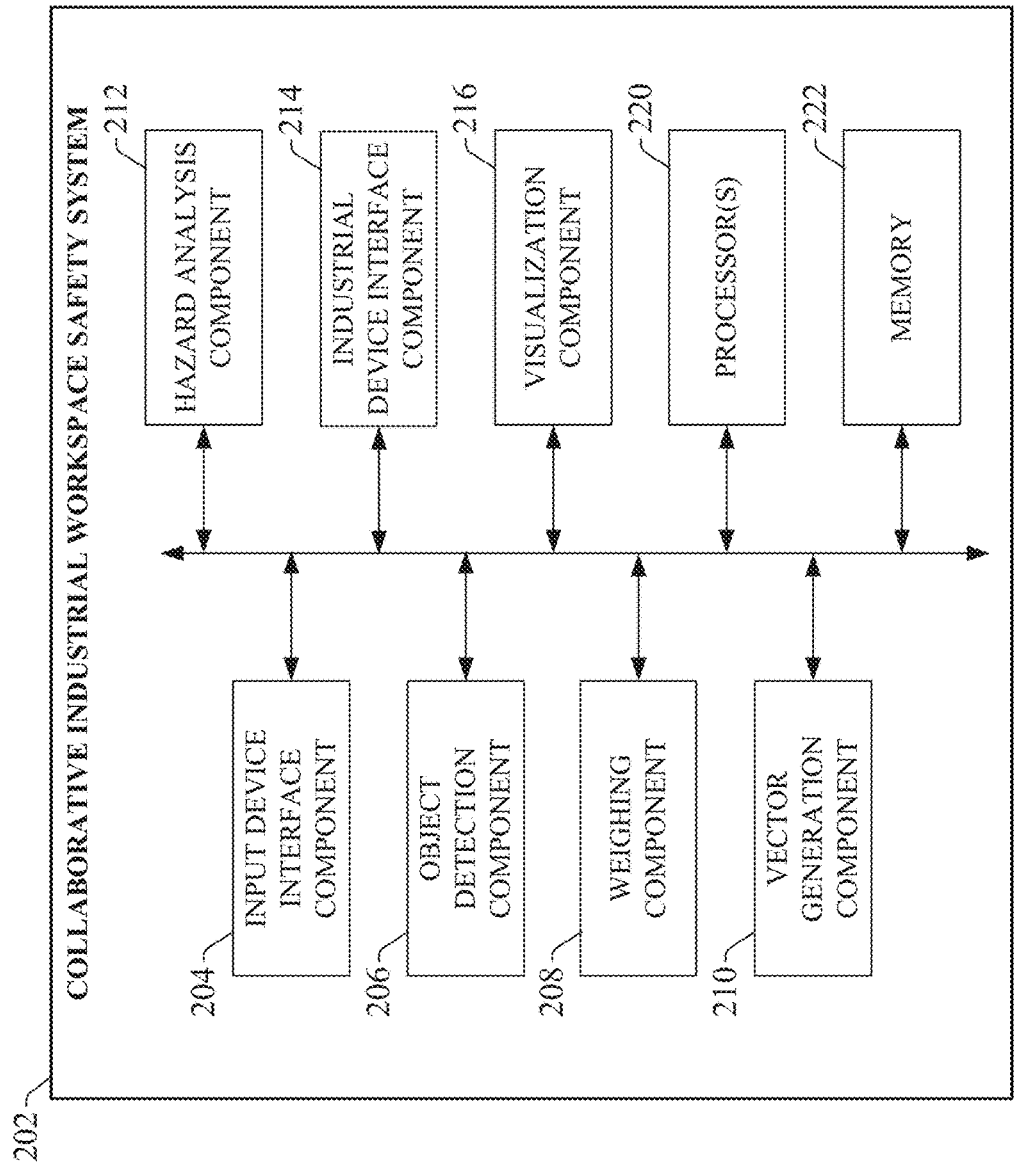
FIG. 2 is a block diagram of an example collaborative industrial workspace safety system.

FIG. 2 is a block diagram of an example collaborative industrial workspace safety system 202 according to one or more embodiments of this disclosure. Although FIG. 2 depicts certain functional components as residing on the same physical system 202, one or more of the functional components illustrated in FIG. 2 may reside on one or more separate devices relative to system 202 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Collaborative industrial workspace safety system 202 can include an input device interface component 204, an object detection component 206, a weighing component 208, a vector generation component 210, a hazard analysis component 212, an industrial device interface component 214, a visualization component 216, one or more processors 220, and memory 222. In various embodiments, one or more of the input device interface component 204, object detection component 206, weighing component 208, vector generation component 210, hazard analysis component 212, industrial device interface component 214, visualization component 216, the one or more processors 220, and memory 222 can be electrically and/or communicatively coupled to one another to perform one or more of the functions of the collaborative industrial workspace safety system 202. In some embodiments, components 204, 206, 208, 210, 212, 214, and 216 can comprise software instructions stored on memory 222 and executed by processor(s) 220. Collaborative industrial workspace safety system 202 may also interact with other hardware and/or software components not depicted in FIG. 2. For example, processor(s) 220 may interact with one or more external user interface devices, such as a keyboard, a mouse, a display monitor, a touchscreen, or other such interface devices. Collaborative industrial workspace safety system 202 may also include network communication components and associated networking ports for sending data generated by any of components 204,

206, 208, 210, 212, 214, and 216 over a network (either or both of a standard data network or a safety network), or over a backplane.

Input device interface component 204 can be configured to receive sensor data from one or more input source devices that monitor a potentially hazardous industrial area. Sensing devices that can provide data to the input device interface component 204 can include, but are not limited to, 3D imaging sensors such as TOF cameras, 2D imaging sensors, photo-detectors, laser scanners, telemetry devices (e.g., pressure meters, flow meters, temperature sensors, pressure sensors, etc.), safety input devices (e.g., safety mats, light curtains, etc.), or other such devices. In general, the sensing devices can include devices designed to detect locations and/or movements of objects, machines, vehicles, and people within the plant environment, as well as devices that measure telemetry values for an industrial machine or process that may be indicative of a hazard to human personnel. The data collected via the input device interface component 204 can be weighted, tracked, and correlated by system 202 to determine a probability that a human will dangerously interact with a hazard (e.g., moving machine, a part, radiation, a gas leak, etc.) at a future time.

Object detection component 206 can be configured to identify and classify objects within the monitored area represented by the sensor data. This can include, for example, detecting and identifying objects within 2D or 3D image data using RGB analysis, greyscale analysis, edge detection, contour analysis, image sharpening, contrast adjustment, difference and additive imaging, etc. In some embodiments, object detection component 206 can be configured to identify objects within a viewing area and determine whether the identified objects correspond to one or more defined object classifications (e.g., a human being, a forklift or trolley, a machined part on a conveyor, a pallet containing packaged products, etc.).

Weighing component 208 can be configured to apply weight values to each source of data collected by input device interface component 204, where the weight values are indicative of an accuracy or reliability of each data source. Weighing component 208 can determine the weight to be assigned to a given data source based on such factors as the sensing technology used by the source device to obtain its value, a determination of whether the value reported by the device is near a limit of the device's sensing capabilities, characteristics of the object or person being detected that may impact the reliability of a measurement of that object or person, environmental conditions in proximity of the sensing device at the time a value was measured (e.g., an amount of smoke, dust, or other pollution, an amount of vibration, an amount of ambient light, etc.), or other such factors.

Vector generation component 210 can be configured to aggregate the weighed sensor data for a monitored area of a plant facility to yield vector data for each detected entity (e.g., object, person, machine, and/or hazard source) within the monitored area. This vector data can characterize the past and present three-dimensional trajectories and velocities of the entity. Hazard analysis component 212 can be configured to perform predictive analysis on the vector data to determine future trajectories and locations of the monitored entities relative to one another. Based on this predictive analysis, the hazard analysis component 212 can determine whether there is an elevated likelihood (e.g., in excess of a defined probability threshold) of a person tracked by the vector data intersecting or interacting with a moving machine, part, vehicle, or other hazard source (e.g., a toxic gas leak, radiation, etc.).

The industrial device interface component 214 can be configured to generate control signals directed to one or more industrial devices within the monitored area based on results of the hazard analysis performed by hazard analysis component 212. Example actions that can be implemented by industrial device interface component 214 can include, for example, sending a control signal to a control or supervisory device (e.g., an industrial controller, an on-board computer mounted in a mobile vehicle, etc.) to perform a control action, initiating a safety action (e.g., removing power from a hazardous machine; switching an industrial system to a safe operating mode; changing a trajectory of a moving machine or vehicle to prevent intersection with a path of human trajectory; turning off a pump or motor; modulating a force, torque, temperature, acceleration, or pressure; etc.), sending a notification message to one or more plant personnel via a human-machine interface (HMI) or a personal mobile device to alert a user of the hazard, initiating an alarm (e.g., visual, audible, tactile, electrical, olfactory, etc.) to warn a person in the monitored area of a possible danger, or other such actions.

Visualization component 216 can be configured to generate display screens on a client device (e.g., a desktop computer, laptop computer, tablet computer, mobile personal device, wearable computer, etc.) that render graphical representations of the past, present, and predicted future trajectories or vectors of the detected entities. In some embodiments, visualization component 216 can color-code the graphical vectors according to such factors as a severity of a possible interaction between two of the vectors, a likelihood that the vectors represent that actual future trajectories of the entities, a time until a vector is expected to dangerously intersect with another vector, or other such criteria.

The one or more processors 220 can perform one or more of the functions described herein with reference to the systems and/or methods disclosed. Memory 222 can be a computer-readable storage medium storing computer-executable instructions and/or information for performing the functions described herein with reference to the systems and/or methods disclosed.

Although components 204-216 are depicted in FIG. 2 as integrated components of safety system 202, in some implementations some of the components 204-216 may reside on two or more separate hardware components of a distributed system. For example, instances of weighing component 208 may reside on one or more of the sensing devices themselves so that the sensing devices can report their own confidence weights to the safety system 202 based on local conditions determined by the sensing device itself, as will be discussed in more detail herein.

Figure 3:
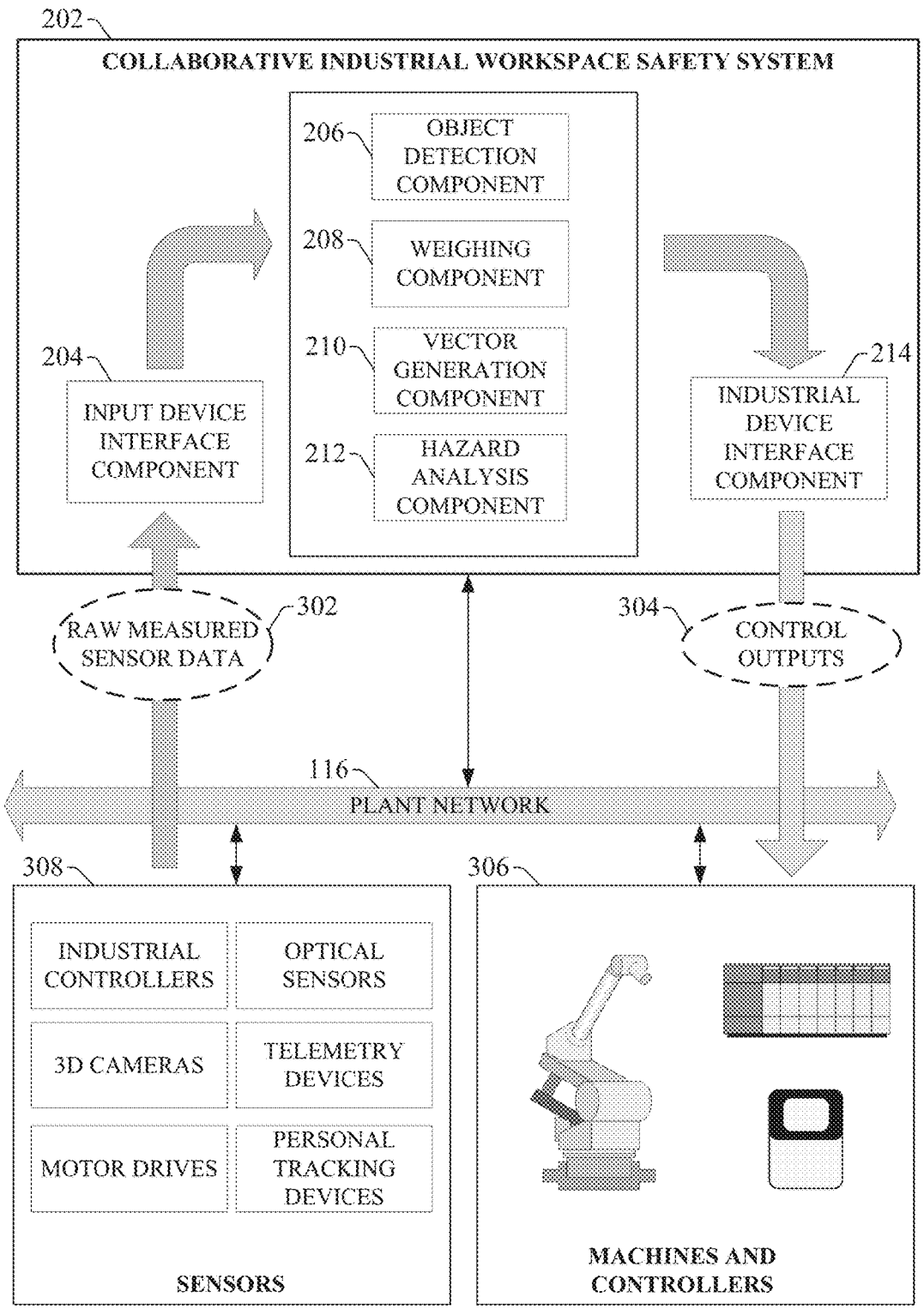
FIG. 3 is a diagram illustrating a generalized architecture that includes a collaborative industrial workspace safety system that performs supervisory safety functions within an industrial environment.

FIG. 3 is a diagram illustrating a generalized architecture that includes a collaborative industrial workspace safety system 202 that performs supervisory safety functions within an industrial environment. In this example architecture, safety system 202 resides on a plant network 116 together with sensor data source devices 308, which can include industrial sensors, industrial controllers, motor drives, optical sensors, telemetry devices, personal location tracking devices carried by plant personnel or mounted on vehicles, and other sources of information. Sensor data source devices 308 provide data that can be used by the safety system 202 to predict possible dangerous interactions between humans and hazardous machines or events (e.g., speed and location information for humans, machines, or objects; operating mode indicators for industrial machines, etc.). Information from source devices 308 can be collected by the safety system's input device interface component 204 as raw measured sensor data 302.

Plant network 116 also connects safety system 202 to a number of industrial machines, industrial controllers, motor drives, or other devices to which the safety system 202 (via input device interface component 204) can send control outputs 304 in order to modify the behavior of hazardous controlled industrial assets. Although the example architecture of FIG. 3 depicts the safety system 202, sensor data source devices 308, and machines 306 as residing on plant network 116, it is to be appreciated that any of the devices or systems depicted in FIG. 3 can be connected to other devices or systems in other ways. For example, some of the source devices 308 may be connected via hardwire connections to inputs of an industrial controller or motor drive that controls an industrial machine, rather than being connected to the plant network. In such configurations, safety system 202 may obtain the values of these sensors by reading the values from the industrial controller's I/O data table rather than obtaining the sensor values directly from the sensors themselves via network 116. In another example configuration, some of the sensor data source devices 308 may also be connected to the safety system's input device interface component 204 via direct hardwired connections rather than via the plant network 116.

Figure 4:
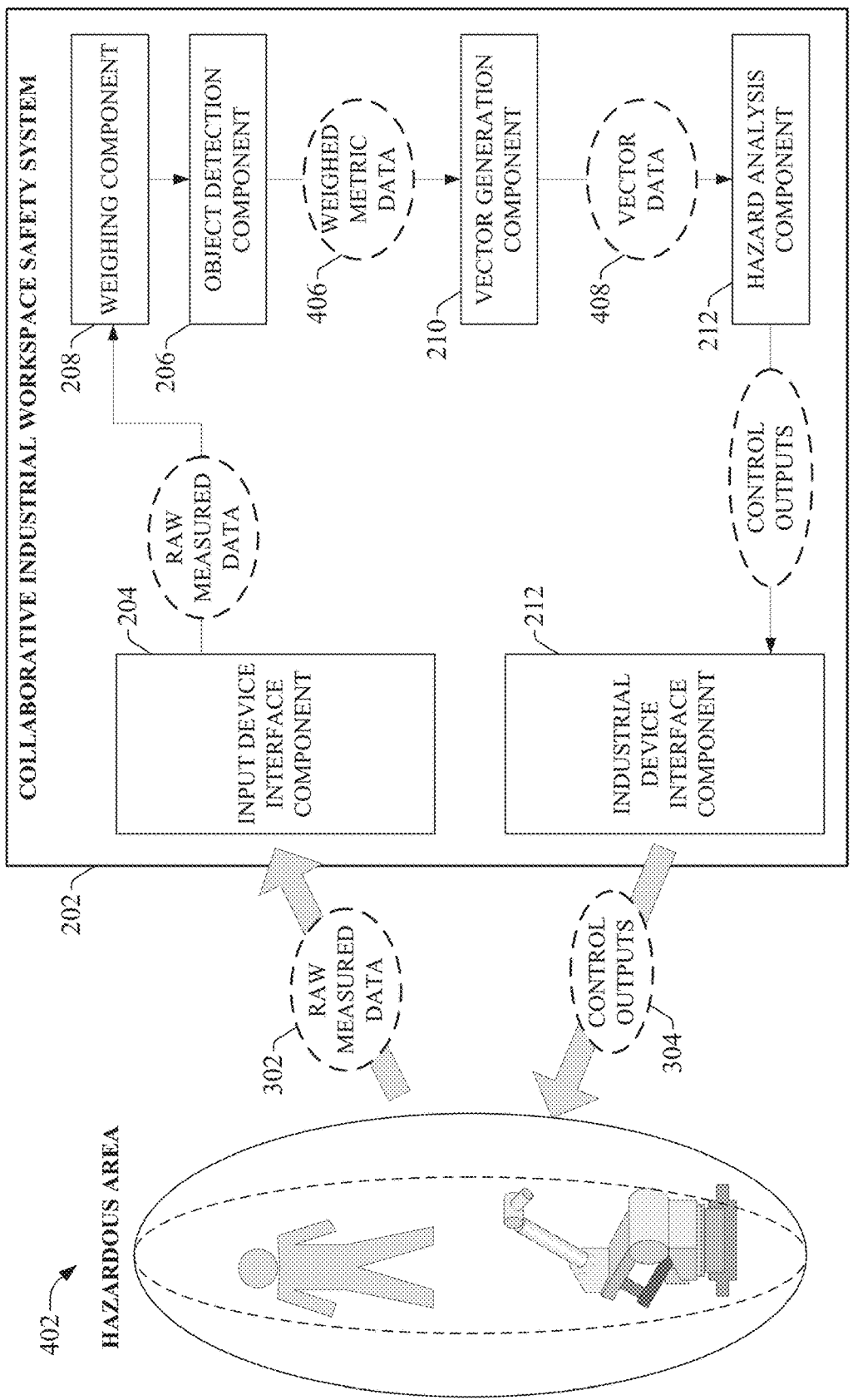
FIG. 4 is a diagram illustrating general data flows and data processing implemented by one or more embodiments of safety system.

FIG. 4 is a diagram illustrating general data flows and data processing implemented by one or more embodiments of safety system 202. As noted above, the safety system 202 collects (via input device interface component 204) raw measured sensor data 302 from one or more industrial sensors distributed throughout a hazardous industrial area 402 being monitored. This raw measured data 302 can include data indicative of the locations, movements, orientations, velocities, diffusions, or other such characteristics of people, machines, vehicles, materials, or entities within the monitored area 402 that can be used by the safety system 202 to determine the presence, classifications, locations, trajectories, and/or behaviors of the entities within the area 402, as well as to predict likely future interactions between the entities. Sources of raw measured data 302 can include both safety-rated devices as well as non-safety rated devices. As will be discussed in more detail below, some embodiments of safety system 202 can apply weights and/or rankings to sources of measured data 302 based on an inferred reliability or accuracy of the data source.

Example sources of raw measured data 302 can include 3D imaging sensors (e.g., TOF cameras, laser scanners, etc.) that scan portions of the hazardous area 402 and generate point cloud data—or pixel-level distance information—for their respective views of the hazardous area. In general, 3D sensors are designed to generate distance information as well as two-dimensional shape information for objects and surfaces within the sensor's viewing field. Some types of TOF cameras determine a distance of an object using phase shift monitoring techniques, whereby a beam of light is emitted to the viewing field, and the measured phase shift of light reflected from the object relative to the emitted light is translated to a distance value. Other types of TOF sensors that employ pulsed light illumination measure the elapsed time between emission of a light pulse to the viewing field and receipt of a reflected light pulse at the sensor's photo-receiver. Since this time-of-flight information is a function of the distance of the object or surface from the sensor, the sensor is able to leverage the TOF information to determine the distance of the object or surface point from the sensor. FIG. 5a is a diagram illustrating 3D image analysis of an image 506 using a 3D image sensor 502. As shown in this figure, 3D analysis yields distance or depth information in the z-direction (that is, the distance of objects and surfaces from the sensor 504) as well as imaging information in the x-y plane.

Sources of raw measured data 302 can also include two-dimensional (2D) imaging sensors that detect and identify shape and/or surface characteristics of objects within a viewing field of the sensor. FIG. 5b is a diagram illustrating 2D image analysis of an image 508 using a 2D image sensor 504. Some types of 2D imaging sensors 504 (e.g., imaging cameras) operate by projecting a wide, light beam toward an area to be monitored and collecting the reflected light reflected from the surfaces and objects within the viewing area at a receiver. Some sensors 504 may sweep the light beam across the viewing area in an oscillatory manner to collect line-wise image data, which is analyzed to identify object edges and surfaces, surface patterns, or other such information. Alternatively, the sensor 504 may project a stationary, substantially planar beam of light across an area of interest and collect data on objects that pass through the beam. In general, 2D image sensors 504 perform grayscale or red-green-blue (RGB) analysis on the pixel data generated based on the reflected light to yield two-dimensional image data for the viewing field represented by image 508, which can be analyzed to identify object edges, object surface patterns or contours, or other such information. Thus, 2D image analysis yields object and surface information in the x-y plane.

Input device interface component 204 can also be configured to obtain at least some of raw measured data 302 from one or more industrial controllers (e.g., industrial controllers 118) that monitor and control industrial assets (e.g., industrial machines, robots, conveyors, mixers, etc.) within the monitored area. In such scenarios, input device interface component 204 can obtain selected items of data from an industrial controller's memory (e.g., the controller's data table), where the items of data may comprise digital and/or analog values of sensor input devices connected to the controller's hardwired inputs or network interface. The sensor input devices may comprise, for example, telemetry devices (e.g., temperature meters, pressure meters, flow meters, tank level meters, etc.), photo-electric sensor, proximity switches, or other such sensors. The input sensor devices can translate their sensed values to voltage or current input signals (e.g., 4-20 mA signals, 0-10 VDC signals, etc.) provided to the controller's inputs. The controller translates the input signals to digital and/or analog values that are maintained in the controller's data table in memory and updated substantially in real-time. The controller can also maintain calculated values that are computed internally based on the sensor input values. Information regarding a current operating mode or operating speed of a controlled machine or other industrial asset can also be collected from the controller's data table by input device interface component 204. Any of these sensor input values or calculated values can be read from the controller's data table by input device interface component 204 (e.g., via plant network 116) and used to predict possible hazardous interactions, as will be described in more detail herein.

Motor drives (e.g., variable frequency drives or other types of motor drives) can also serve as sources of at least some of raw measured data 302, providing speed, acceleration, deceleration, torque, and force values for their associated motors (which may drive conveyors, robot or machine axes, or other moving machine components). This information can be used by safety system 202 in connection with predicting future locations of industrial assets or machine components that are driven by the motors.

Figure 6A:
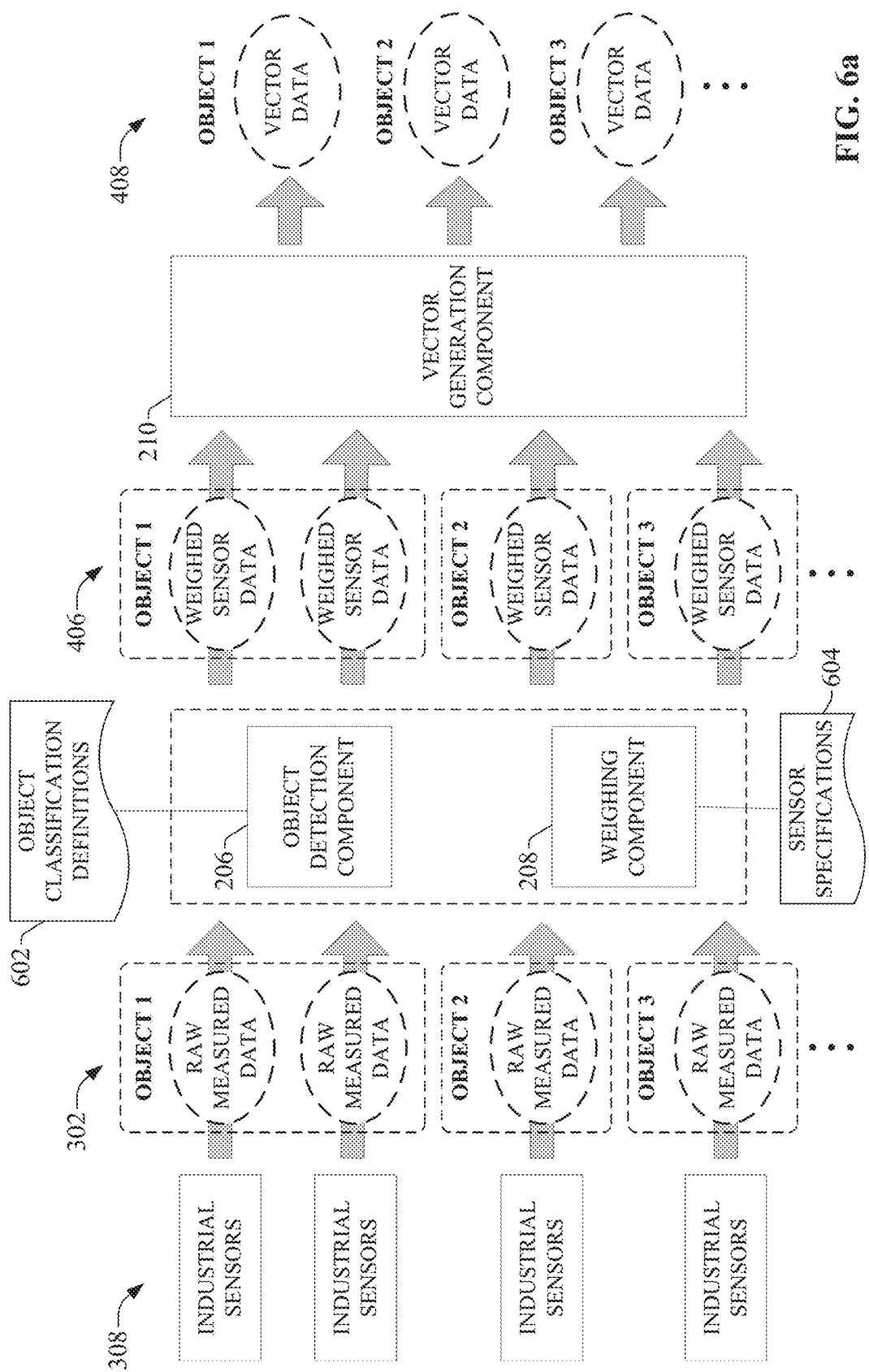
FIGS. 6a and 6b are diagrams illustrating example data flows and processing performed by an example collaborative industrial workspace safety system.
Figure 6B:
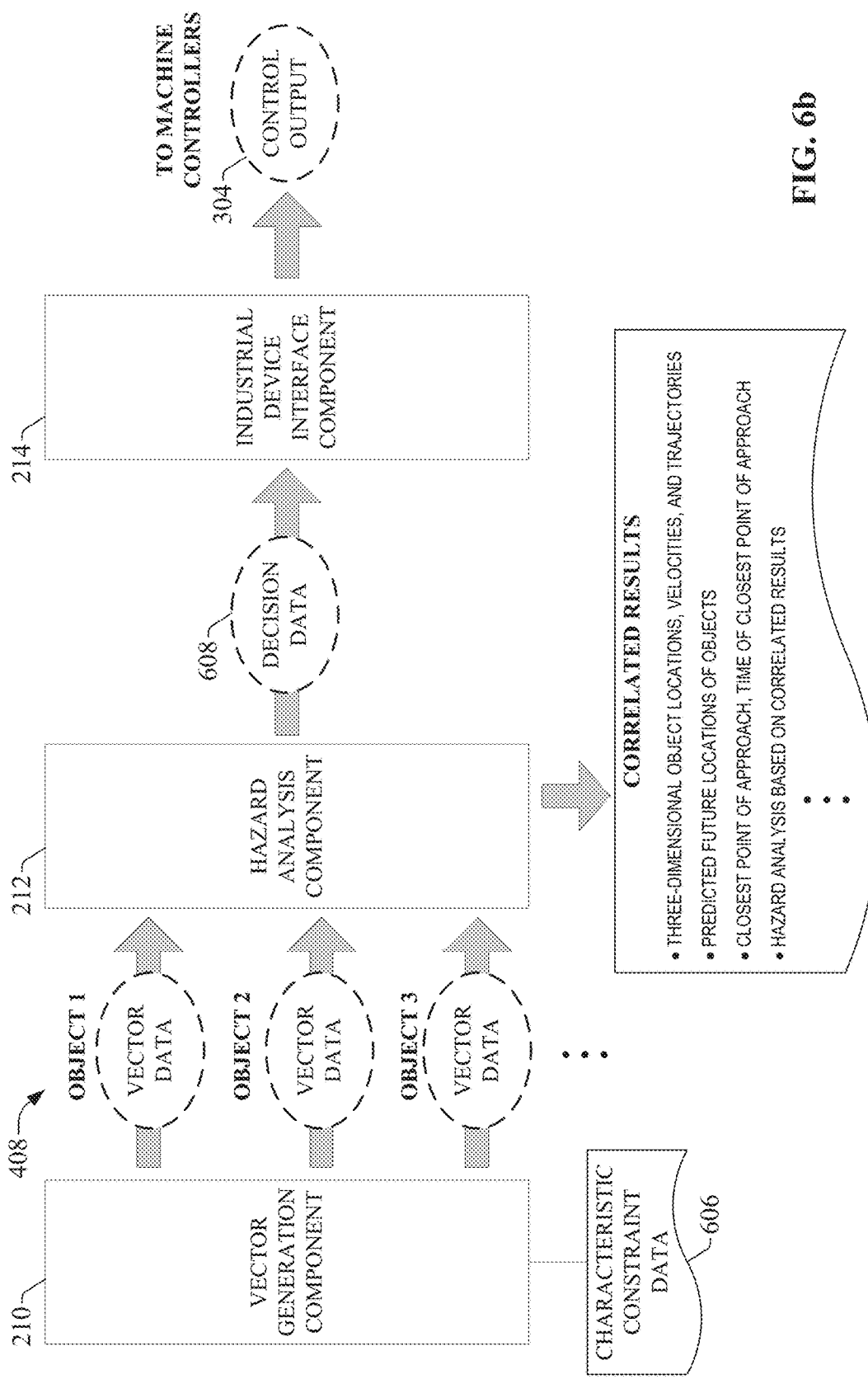

As illustrated in FIG. 4 as well as FIGS. 6a and 6b, safety system 202 collects this raw sensor data 302 from a variety of source devices 308 (e.g., photo-sensors, telemetry devices, 2D and 3D imaging cameras, laser scanners, industrial controllers, motor drives, etc.) that provide information regarding presence, states, and behaviors of objects (e.g., people, machines, vehicles, etc.) within a hazardous industrial area 402. The object detection component 206 and weighing component 208 then aggregate and pre-process this raw measured data 302 in preparation for generating vector information for objects or entities detected within the hazardous area. For example, object detection component 206 can identify and classify entities within the hazardous area 402 based on analysis of the raw measured sensor data 302. The manner in which object detection component 206 detects and classifies entities or objects to be tracked within the monitored hazardous area 402 can depend on the types and/or functions of the source devices 308 from which measured sensor data 302 is received. For example, if a portion of measured data 302 comprises image data received from a 2D imaging source, object detection component can perform RGB or greyscale analysis on the received image data, including but not limited to edge detection, contour analysis, image sharpening, contrast adjustment, difference and additive imaging, etc. Object detection component 206 can employ such 2D image analysis to identify objects within the image data (corresponding to a view of hazardous area 402) and determine whether the identified objects correspond to one or more defined object classifications (e.g., a human being, a forklift or trolley, a machined part on a conveyor, a pallet containing packaged products, etc.). In some such embodiments, object detection component 206 can be configured to reference object classification definitions 602 that define characteristic properties of respective object types of interests. Object detection component 206 can compare these definitions 602 with objects identified in the image data to facilitate accurate classification of the objects.

In the case of 2D or 3D imaging devices in which groups of pixels representing people or objects are identified, some embodiments of object detection component 206 can also be configured to identify non-contiguous groups of pixels that belong to a single object of a defined classification. This can allow the object detection component 206 to identify the presence of a person within the viewing area even if the person is partially obscured within the image. For example, object detection component 206 may be trained to identify the presence of two separate visible objects corresponding to human legs, and to correlate these two objects within the image as belonging to a human being who is within the viewing area but partially obscured. Once identified as such by the object detection component 206, safety system 202 can track these correlated objects relative to detected hazardous conditions so that appropriate safety outputs can be delivered as needed, as will be described in more detail below.

In another example, some sources of raw measured data 302 may be known to have a fixed association with a specific machine, portion of a machine, vehicle, or person. For example, information received from a particular motor drive (e.g., speed, acceleration, deceleration, or position information) can be known by the safety system 202 to represent behaviors of a particular machine component (e.g., a conveyor carrying parts, a robot axis, a palletizer, a positioner, etc.). Accordingly, object detection component 206 will associate all measured data 302 from this motor drive (e.g., speeds, positions, accelerations, etc.) with the machine component associated with the drive. Similarly, object detection component 206 may receive position information from a tracking device known to be carried by a person or attached to a vehicle, and will therefore associate all location information received from this device with the appropriate person or vehicle.

Figure 7:
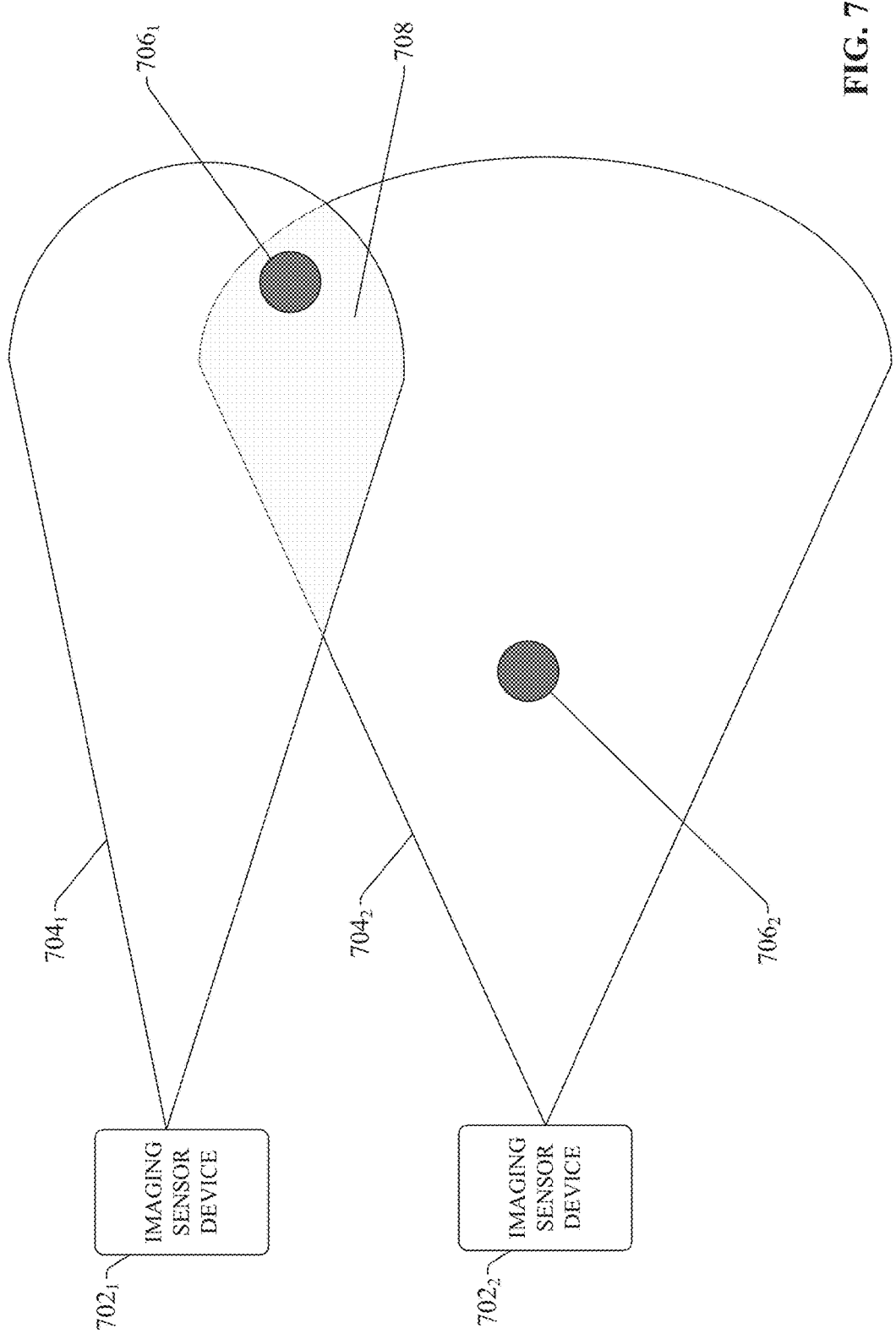
FIG. 7 is a diagram illustrating overlapping viewing fields of respective two imaging sensor devices.

In some scenarios, multiple sources of measured data 302 may correspond to the same object or person (e.g., the multiple items of measured data 302 received for Object 1 as illustrated FIG. 6a). For example, two different 2D or 3D imaging devices may be oriented to monitor two different but overlapping views of a hazardous area. FIG. 7 is a diagram illustrating overlapping viewing fields $704_1$ and $704_2$ of respective two imaging sensor devices $702_1$ and $702_2$. In this example, imaging sensors $702_1$ and $702_2$ are positioned and oriented such that their respective viewing fields $704_1$ and $704_2$—that is, the areas illuminated and monitored by the imaging sensors $702_1$ and $702_2$—overlap with one another at overlap area 708. Object $706_2$ is located within the viewing area of imaging sensor device $702_2$ only. Consequently, location information (and distance information in the case of 3D imaging devices) provided by imaging sensor device $702_2$ for the pixels corresponding to object $706_2$ will be associated with object $706_2$ by object detection component 206. Object $706_1$ is located within the overlap area 708 monitored by both imaging sensor devices $702_1$ and $702_2$. As such, sensor devices $702_1$ and $702_2$ provide respective different sets of location and distance data for object $706_1$. Object detection component 206 can identify that both sets of data correspond to the same object $706_1$, and based on this common association, safety system 202 will aggregate the two sets of data corresponding to object $706_1$ into an aggregate multivariate vector for the object $706_1$.

Although the example illustrated in FIG. 7 depicts multiple sources of location and behavior information for a common object as being provided by the same type of sensor device (imaging sensor devices), safety system 202 can also aggregate information corresponding to a common object received from a heterogeneous set of sensor devices. For example, an object or person within a monitored industrial area may be detected by both a laser scanner and a photo-detector, and measured data from these two disparate sources can be combined by the safety system 202 into an aggregate vector for the person or object for tracking and predicting purposes. In another example, a motor drive may control motion of a machine component or a product being conveyed by a motor-driven conveyor, and an imaging sensor may also be oriented to monitor the machine or product line. Accordingly, measured data 302 about the behavior of the machine component or product is generated by both the motor drive and the imaging sensor. Safety system 202 can receive measured data from both of these sources (e.g., speed and acceleration data from the motor drive, and 2D or 3D location information relative to the frame of reference of the imaging sensor's viewing field), and object detection component 206 can determine that both sets of information correspond to the same machine component or product. Based on this determination, safety system 202 will aggregate the two sets of measured data into an aggregate vector for the machine component or product.

Returning to FIG. 6a, after raw measured data 302 has been received and object detection component 206 has identified objects or people corresponding to the items of measured data 302, weighing component 208 applies weights to each source of the raw measured data 302 indicating a confidence in the reliability or accuracy of the data source to yield weighed sensor data 406. Weighing component 208 can determine a reliability of a given item of raw measured data 302 based on a variety of factors, some of which may depend on the type of sensor device from which the data is received. For example, the accuracy of location and distance information provided by 2D or 3D imaging sensor devices can vary as a function of the detection circumstances. Variable conditions of the light emission and receiving paths—e.g., due to variations in the atmospheric conditions of the light paths—can cause the level or intensity of the light signal received at the sensor device to vary over a wide range. In general, high levels of particulates in monitored area can attenuate the level of the light signal and thereby reduce the sensor's accuracy. Moreover, the reflectivity of an object within the sensor's field of view can affect the accuracy with which the sensor can detect the object. An imaging sensor's detection abilities may also be less reliable when detecting objects that are near the end of the sensor's detection range. For example, returning briefly to FIG. 7, object 706₂ is located well within the maximum detection range of imaging sensor device 702₂, while object 706₁ is located near the maximum sensing distance of imaging sensor device 702₂. As a result, safety system 202 may assume that the location and distance data generated by imaging sensor device 702₂ for object 706₂ may be more accurate than the location and distance data generated by imaging sensor device 702₂ for object 706₁, and weigh the data provided by sensor device 702₂ for each object accordingly (e.g., by assigning a higher weight value to the distance data for object 706₂ than for object 7060.

In various embodiments, weighing component 208 can be configured to consider these and/or other factors for each source of measured data 302 and apply a confidence or reliability weight to the subset of measured data 302 generated by that source to obtain weighted sensor data 406 for the data source. For example, in the case of a 2D or 3D imaging sensor, weighing component 208 can be configured to determine whether a signal level of pixels corresponding to the object or person within the image is near a saturation threshold for the pixels, or is near a minimum detectable signal level for the pixels. High pixel signal levels near the pixel saturation threshold can be caused by highly reflective or bright objects or clothing, while a low pixel signal levels near the minimum detectable signal level may be caused by dark objects or clothing having low reflectivity. If the signal level is near either the upper or lower signal level for the pixels, weighing component 208 can apply a relatively low confidence weight to that sensor's data for the object or person. Alternatively, if the pixel signal level for the pixels corresponding to the object or person is near the middle of the detectable signal level range, weighing component 208 can apply a relatively high confidence weight to the sensor's data for the object or person.

Weighing component 208 can also consider whether the sensor device is a safety-rated device or a non-safety-rated device in connection with determining a weight value to apply to that sensor device's data. In general, safety-rated devices can be assumed to have a higher accuracy and reliability than non-safety rated devices. Accordingly, weighing component 208 can apply a relatively high weight value to data received from a safety-rated device while applying a relatively low weight value to data received from a non-safety-rated device. In various embodiments, weighing component 208 may identify safety-rated devices based on self-identifying data provided by the devices themselves, or may reference sensor specification data 604 stored on the safety system 202 that records specification data for one or more of the sensor devices 308, and which may identify which of the sensor devices 308 are safety-rated devices.

This general principle can be applied by the weighing component 208 for other types of sensors or detection parameters. For example, weighing component 208 can consider a location of an object or person within a 2D or 3D sensor's viewing field relative to the extreme ends of the sensor's detection range when determining a suitable weight for the data. Accordingly, a relatively high weight value will be applied to measured data 302 for objects that are well within the detection range of the sensor (e.g., object 706₂ of FIG. 7) while a relatively low weight value will be applied to objects near either the near or far extreme of the sensor's distance range (e.g., object 706₁ of FIG. 7). In general, for a sensor device 308 having a limited range of measurement of a given parameter (e.g., distance, x-y position, speed, weight, acceleration, etc.), weighing component 208 can determine a weight value for data generated by the sensor device 308 based on a comparison of the measured value with the extreme ends of the sensor's measurement range. In some embodiments, weighing component 208 can be configured with sensor specification data 604 that defines, for one or more sensor devices 308 that provide data to the safety system, valid measurement ranges and/or other sensor device specification information that can be referenced by the weighing component 208 to determine a confidence weight to be applied to the sensor's data.

In some scenarios, weighing component 208 can determine a suitable weight value to be applied to a measured data value based at least in part on additional contextual data provided by the sensor device 308 that generated the measurement data. For example, in addition to providing its measured data 302, a sensor device 308 may also provide its own self-generated reliability metric for the data. The sensor device 308 may determine its own reliability based on such factors as the sensor device's determination that a measured value is near an end of the sensor's valid measurement range, the sensor's determination that a light signal level at a pixel group corresponding to an object or person is near either the pixel saturation level or the minimum sensing level for the pixel, a measured atmospheric condition in proximity of the sensing device (e.g., an amount of smoke, dust, or other particulates; an amount of vibration, etc.), a fault condition of the sensor device that may affect the reliability of the sensor's readings, an age of the sensor device, or other such factors. In general, weighing component 208 can apply relatively low confidence weights to data values received from sensors that self-report relatively low reliabilities for their associated measured values, while applying relatively high confidence weights to data values received from sensors that self-report relatively high reliabilities for their measured values.

In some scenarios, rather than provide an explicit reliability metric to the safety system 202, one or more sensor devices 308 may provide other contextual information to the system 202, such as an operating state of the sensor (e.g., an indication of a fault condition present on the sensor, a mode of the sensor, etc.), measured atmospheric conditions in proximity of the sensor (e.g., dust or smoke levels, vibration, temperatures, etc.), or other such information that may impact the reliability of the sensor's measurements. Weighing component 208 can then generate a weight value for measured data values received from these sensor devices 308 based in part on these reported contextual conditions (e.g., by applying relatively high weights to values received from sensors that report conditions indicative of high reliability, while applying relatively low weights to values received from sensors that report conditions indicative of relatively low reliability).

In other example implementations, safety system 202 can be configured to measure its own contextual information for the monitored industrial area. In such implementations, input device interface component 204 can receive contextual data for the monitored area from dedicated measurement devices (e.g., devices that measure a level of particulates in the monitored area, temperature meters, vibration sensors, etc.), determine which sensor devices 308 may be rendered less accurate or reliable as a result of the measured contextual conditions, and generate weight values for to be applied to measured data from those sensor devices 308 based on the measured contextual conditions. For example, if an elevated level of dust is measured for an area at which a 3D camera is located, weighing component 208 can reduce the weight value applied to object distance information reported by that 3D camera, indicating to vector generation component 210 that the reliability of that distance value may be less than would be expected during nominal operating conditions. Weighing component 208 can maintain this attenuated weight value while the measured dust level remains elevated for the area in proximity to the camera. Weighing component 208 can also apply this approach to other types of sensor devices using other types of measured contextual data in various embodiments.

Depending on the types of sensor devices and the factors that determine the weight values, weighing component 208 can apply weight values either to all data generated by a given sensor device 308 (and thereby to all people or objects detected by the sensor device 308), or may apply weight values to specific entities (e.g., machines, people, vehicles, moving objects, etc.) detected by the object detection component 206. For example, contextual information indicative of a condition that may attenuate the reliability of all data generated by a 3D camera—such as a fault condition on the camera, high levels of mist on the camera's lens, or high levels of pollutants in proximity of the camera—may cause the weighing component 208 to apply a reduced weight value to all measured data 302 generated by the camera. However, contextual information indicative of a condition that may only attenuate the reliability of detection of a specific object detected by the camera—e.g., the fact that the object is located at a distance from the camera near the end of the detection range for the camera—may cause the weighing component 208 to apply a reduced weight value only to pixel-level distance data corresponding to the subset of camera pixels encompassing the object, while applying a comparatively high weight value to the remaining pixel data provided by the camera (including pixel data corresponding to other entities that are well within the detection range of the sensor).

Figure 8:
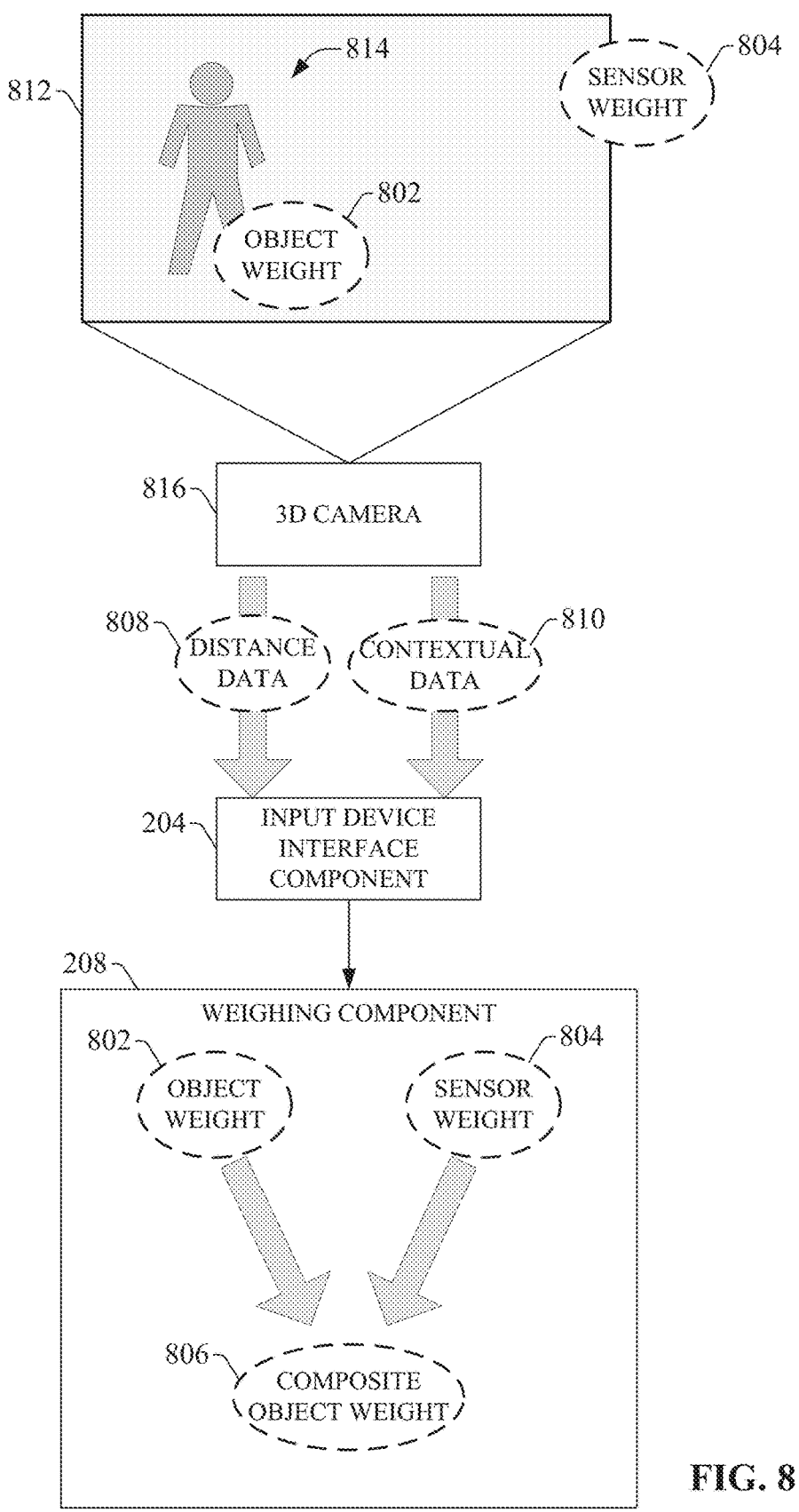
FIG. 8 is a diagram illustrating generation of a composite object weight by a weighing component of an example collaborative industrial workspace safety system.

In some embodiments, weighing component 208 can be configured to aggregate device-level and object-level weight values to yield a composite weight value for a particular object. FIG. 8 is a diagram illustrating generation of a composite object weight 806 by weighing component 208. In this example, a 3D camera 816 monitors a scene 812 within a hazardous industrial area, and provides input device interface component 204 with both pixel-level distance data 808 for the monitored scene 812 and contextual data 810 indicative of a current context of one or both of the 3D camera or the environment extrinsic to the camera 816. In this example scenario, the contextual data 810 reports a condition that may impact the reliability of the camera 816 as a whole, such as a fault condition on the camera 816 or sub-optimal atmospheric conditions in proximity of the camera 816 (although FIG. 8 depicts contextual data 810 as being provided by the camera 816 itself, some or all of contextual data 810 may be provided by a separate measurement device). Weighing component 208 translates this portion of contextual data 810 to a sensor weight 804 that is applied to all data generated by the 3D camera (that is, to all distance information provided by all the pixels of the camera 816).

In addition, contextual data 810 reports another condition that may only impact the accuracy of a distance measurement for a detected person 814 identified in the scene 812, such as a low reflectivity of the person's clothing. Weighing component can translate this portion of contextual data to an object weight 802 that is to be applied only to a subset of the pixel-level distance information corresponding to pixels that encompass the person 814. Weighing component 208 can then aggregate both the object weight 802 (specific to pixels corresponding to the person 814) and the sensor weight 804 (applicable to all pixels) to yield a composite object weight 806 to be applied to the distance data for person 814 reported by 3D camera 816. In an example aggregation technique, weighing component 208 may multiply the raw distance information from the pixels corresponding to person 814 by both the object weight 802 and the sensor weight 804, while multiplying the raw distance information for the remaining pixels by the sensor weight 804 only. Other techniques for combining object and sensor weights to yield a composite object weight 806 are also within the scope of one or more embodiments.

Returning to FIG. 6a, once weighing component 208 has generated and applied appropriate weight values to the respective items of measured data 302 as described above, the resulting weighed sensor data 406 is combined and aggregated by vector generation component 210 to generate multivariate, real-time vector data 408 associated with each identified entity (e.g., person, part of a person, machine, part of a machine, vehicle, etc.). Vector data 408 represents, for each detected entity within the industrial collaborative workspace represented by measured data 302, a direction and magnitude of a behavioral property of the entity as a function of time, where the behavioral property can include, but is not limited to, a location, a velocity, an acceleration, or another behavioral property.

The vector data 408 for a given object or person is generated based on an aggregation of all sets of weighed sensor data 406 for that object or person. In some scenarios, measured data 302 for a given object or person within the monitored industrial area may be provided by multiple different sensor devices 308. For example, an object or person within a monitored hazardous industrial area may be detected by two different imaging sensor devices (e.g., object $706_1$ in FIG. 7) that monitor the hazardous area from two different perspectives or angles. In another example, an object or person within the monitored area may be detected by both a 3D camera (e.g., 3D camera 816 in FIG. 8) as well as a sensor device of another type, such as a 2D imaging device, a photoelectric sensor, a personal location tracking device carried by the person or object, etc.

In general, vector data 408 for a given object or person may be based on multiple versions of the same measured characteristic—e.g., the object or person's location, orientation, speed, acceleration, etc.—provided by multiple different sensor devices 308 and scaled by weighing component 208 according to an estimated accuracy or reliability of each data source. Vector generation component 210 can aggregate the resulting multiple sets of weighed sensor data 406 for each object or person detected in the monitored area to yield the vector data 408 for that object or person. The vector data 408 defines time-series direction and magnitude of the measured behavior of the object or person.

In scenarios in which a monitored property of the object or person (e.g., location, orientation, speed, etc.) for a given point in time is available from more than one source of measured data 302 having different weight values (that is, multiple input sensors that measure the property with different degrees of accuracy or reliability), vector generation component 210 can aggregate the multiple items of weight sensor data 406 for the object or person using any suitable aggregation technique to yield vector data 408 for the object. The aggregation technique employed by vector generation component 210 can take the weight of each item of weighed sensor data 406 into account when generating the aggregate vector data 408 for an object or person, such that a value of weighed sensor data 406 corresponding to a given point in time and having a relatively low weight contributes less to the final vector data value for that point in time than another value of weighted sensor data 406 corresponding to the same point in time but having a higher relative weight.

As will be described in more detail below, vector data 408 for a given object or person includes both actual measured past and present values of the measured characteristic (e.g., location, speed etc.) as well as predicted future values of the measured characteristic. Vector generation component 210 can generate the predicted future values based on analysis of the past and present values together with known characteristic constraints on the detected objects or people that may limit the possible future states of the detected objects or people. The collection of measured past and present states together with the predicted future states—all of which are encoded vector data 408—yield a predictive multivariate vector for the characteristic of the object or person being tracked.

The data flow depicted in FIG. 6a continues in FIG. 6b. Vector data 408 for each object or person detected in the monitored hazardous area is provided to hazard analysis component 212 for aggregated real-time and predictive analysis. In general, hazard analysis component 212 aggregates the vector data 408 for the respective entities detected within the monitored hazardous area (the collaborative workspace) to evaluate, for each object or person, current and future states or behaviors, where the states or behaviors include, but are not limited to, position, direction, speed, acceleration, or other characteristics. When evaluating future states or behaviors, hazard analysis component 212 can also generate metrics of confidence or uncertainty associated with the predicted future states or behaviors so that a probability that the future state or behavior will occur can be assessed. Hazard analysis component 212 can correlate the predicted future states or behaviors for the detected people or objects to determine a risk of a future hazardous interaction between two or more of the objects or people.

Figure 9:
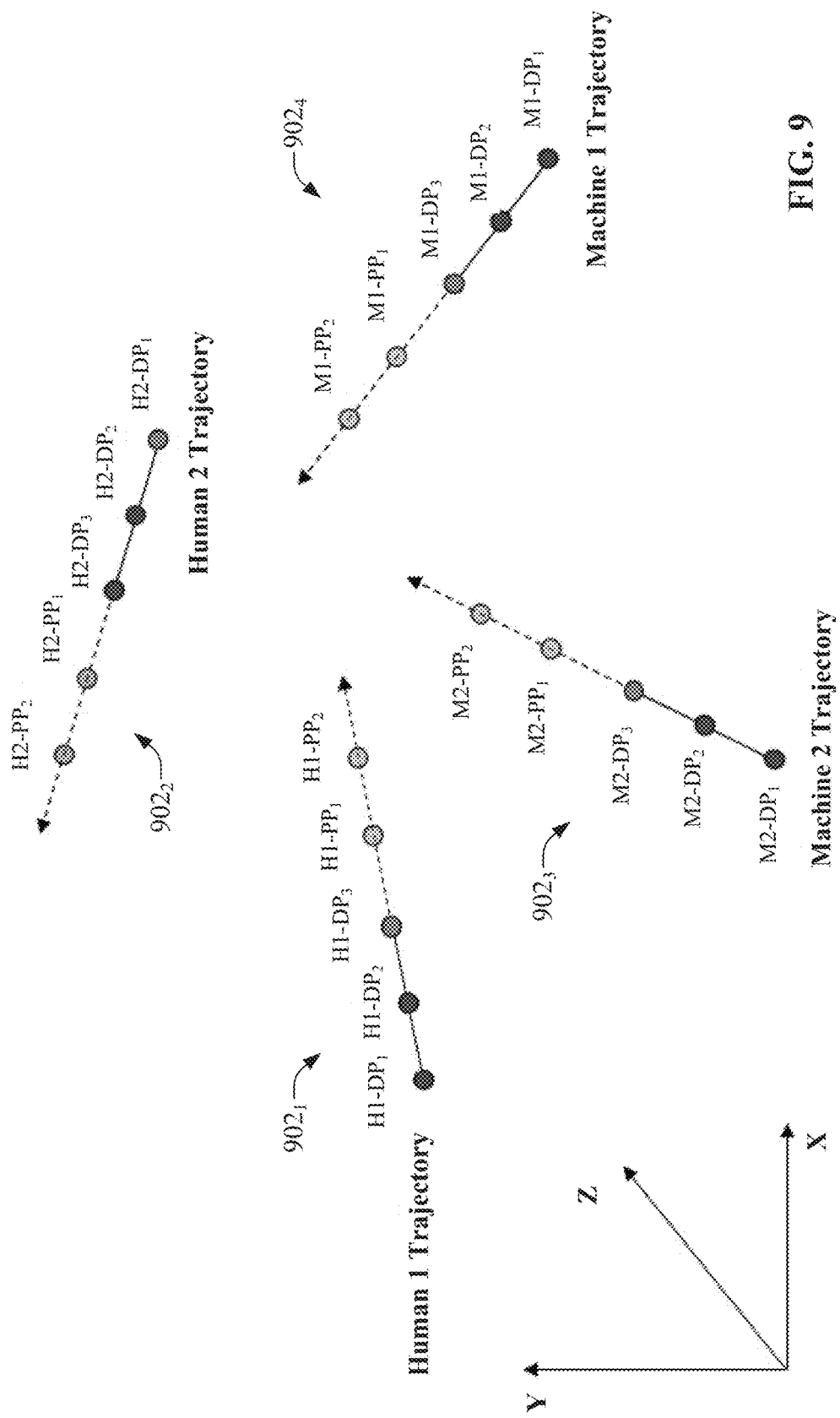
FIG. 9 is a diagram illustrating graphical representations of example vectors corresponding to people and machines detected within a hazardous industrial area.

FIG. 9 is a diagram illustrating graphical representations of example vectors 902 corresponding to people and machines detected within a hazardous industrial area. Vectors $902_1$ and $902_2$ represent two respective humans—Human 1 (H1) and Human 2 (H2)—detected within the monitored area, while vectors $902_3$ and $904_4$ represent respective two moving machines—Machine 1 (M1) and Machine 2 (M2). Machine 1 and Machine 2 can be, for example, a moving component of an industrial robot or motor-driven axis of an industrial machine, a vehicle (e.g., a forklift), a press or sheet metal stamper, or another type of hazardous moving equipment. In the illustrated example, vectors 902 represent the locations of the humans and machines as a function of time within the three-dimensional space of the monitored area. However, it is to be appreciated that some embodiments of safety system 202 can be configured to track other behaviors or states of people, machines, and objects within a monitored area.

Each vector 902 represents a locus of both actual measured positions of its corresponding human or machine (designated "DP" for "detected positions") as well as predicted future positions of the human or machine (designated "PP" for "predicted positions") determined by the hazard analysis component 212 based on an analysis of the actual past and present measured positions as well as known constraints on the behaviors of the humans and machines. The locus of the actual past and present positions and the predicted future positions yields a vector 902 (represented by vector data 408) defining a trajectory of the position as a function of time across a time-span encompassing past, present, and future time instances.

For example, with reference to the Human 1 Trajectory $901_1$, the locations labeled H1-$DP_1$, H1-$DP_2$, and H1-$DP_3$ represent actual detected positions of Human 1 at three consecutive points in time (times $DP_1$, $DP_2$, and $DP_3$). These locations are specified by the vector data 408 generated for Human 1 by vector generation component 210, where the vector data 408 itself is generated based on the measured and weighed sensor data—weighted sensor data 406—specifying the position of Human 1 (which may be based on raw measured data 302 for Human 1 received from multiple sensor devices 308, as described above).

In addition, Human 1 Trajectory $901_1$ includes future predicted locations of Human 1—labeled H1-$PP_1$ and H1-$PP_2$—representing predicted positions of Human 1 at two future consecutive points in time (times $PP_1$ and $PP_2$). Vector generation component 210 can generate these predicted future position values based on an analysis of the trajectory—in terms of both location and speed—defined by vector data 408 for Human 1 up to the present instance in time, as well as known constraints on future movements of Human 1. These constraints may be based on intrinsic fixed or static properties of the entities, and can include, for example, a defined maximum expected speed of Human 1, which can limit the set of possible future locations of Human 1 at certain time instances in the future. In the case of machines, parts of machines, vehicles, atmospheric hazards (e.g., gases), or other non-human entities, constraints that limit possible future predicted locations or states of those entities can include, but are not limited to, rated speed limits or acceleration limits of those entities (e.g., a speed and acceleration limits of a forklift, industrial robot, conveyor or other machine or vehicle), known absolute limits on possible locations of the entities (e.g., an extreme limit on the reach of an industrial robot, mechanically fixed trajectories of a machine component, etc.), diffusion rates (e.g., of gases released into the monitored area), inertias of mechanical components, coefficients of frictions of mechanical components, rated stop times of vehicles or machines, gear reduction ratios of mechanical components, or other such static qualities that may have a limiting effect on possible future states of the detected entities given their current states. The constraints on movement of people or non-human entities can also be dynamic in nature. Such dynamic constraints can include, but are not limited to a current payload or variable weight on the entity, an operating mode, or other such constraints. Static and dynamic constraints of entities being monitored within the hazardous industrial data can be defined as characteristic constraint data 606 and stored on memory 222 of safety system 202. Vector generation component 210 can reference this characteristic constraint data 606 in connection with generating the predicted position (PP) data points of vector data 408.

In some scenarios, some items of characteristics constraint data 606 that are dynamic in nature may be a function of a current state of the person, machine, vehicle, or other entity to which the characteristic constraint data 606 applies. For example, the maximum acceleration and speed of a forklift or other load-bearing vehicle being tracked may be a function of the weight of the vehicle's current payload. Accordingly, characteristic constraint data 606 may define the maximum speed and acceleration of the vehicle not as fixed quantities, but rather as predictable variable quantities that are defined as a function of weight (or as a function of a type of product being borne by the vehicle). During operation, the safety system's input device interface component 204 can be configured to track the payload weight on the vehicle and determine the weight-specific maximum speed and acceleration of the vehicle based on a formula stored as part of characteristic constraint data 606. In the case of certain controlled industrial machines, constraints can be defined as a function of a current or expected operating mode of the machines, which may dictate the machine's speed of operation.

Vector generation component 210 determines the trajectories $902_2$-$902_4$ of Human 2 and Machines 1 and 2 in a manner similar to that of Human 1. Collectively, the vector data 408 for all detected humans, machines, or other entities within the monitored industrial area yield a vector set of all detected entities within the collaborative industrial workspace, where each entity-specific vector 902 represents past, present, and future locations or states of the entities as a function of time. In the illustrated example, data points having similar DP or PP designations correspond to the same instant in time. For example, data points $H1\text{-}DP_3$, $H2\text{-}DP_3$, $M1\text{-}DP_3$, and $M2\text{-}DP_3$ correspond to the respective locations of Human 1, Human 2, Machine 1, and Machine 2 at or near the same point in time (time $DP_3$), although some variations between the corresponding data points may result depending on the speed and resolution of processing by the system 202. The solid line portion of each vector 902 represents actual measured positions of the respective entities, from a point in time in the past ($DP_1$) to the present moment ($DP_3$), while the dotted line portion of each vector 902 represents possible future positions predicted by vector generation component 210 as described above. Hazard analysis component 212 can evaluate these past and expected future trajectories to determine a risk of a hazardous interaction between any two or more of the entities represented by vector data 408.

For example, based on analysis of the vector data 408 for the respective entities, hazard analysis component 212 can determine a closest point of approach (CPA) and a time of closest point of approach (TCPA) for any two of the entities represented by vectors 902. The CPA is a measure of how close the two entities will pass each other if the expected future trajectories hold true, and the TCPA represents a time at which this closest approach will occur. If hazard analysis component 212 determines that the CPA and/or TCPA is indicative of a hazardous or damaging interaction between two of the entities (e.g., a human and a machine), hazard analysis component 212 can generate decision data 608 identifying the hazardous interaction. This information is provided to industrial device interface component 214, which generates one or more control output 304 directed to one or more industrial controllers, machines, notification devices or other devices within the hazardous area intended to either warn of or mitigate the predicted hazardous interaction.

Figure 10:
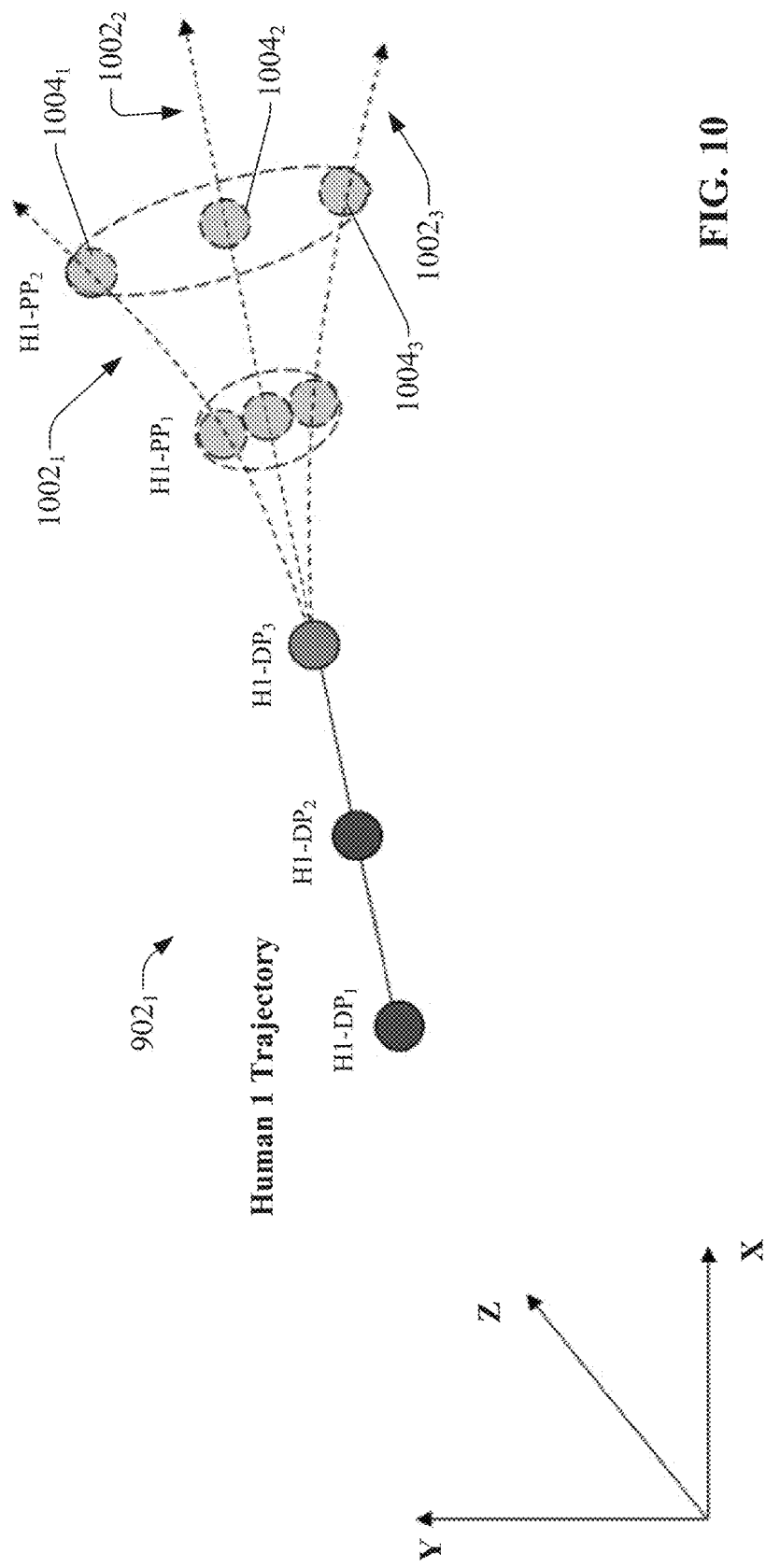
FIG. 10 is a diagram illustrating a vector of a human trajectory for a scenario in which three possible future trajectories are determined.

While the detected past and present positions of entities within the monitored hazardous area are known with a high degree of certainty, predicted future positions of entities may be less certain due to the speculative nature of predictive analysis as well as the possibility of unexpected behavior changes by people, machines, and other entities. Accordingly, hazard analysis component 212 may calculate multiple possible future trajectories for a given object or person within the monitored hazardous area, and rank the possible future trajectories according to calculated probabilities that each future trajectory will occur. FIG. 10 is a diagram illustrating Human 1 vector $902_1$ for a scenario in which three possible future trajectories $1002_1$, $1002_2$, and $1002_3$ are determined. As shown in this example, after the most recently detected position of Human 1—represented by $H1\text{-}DP_3$—vector generation component 210 generates multiple possible future trajectories for Human 1, including trajectories $1002_1$, $1002_2$, and $1002_3$.

In general, vector generation component 210 can consider characteristic properties of the entities (including both static properties and context-specific dynamic properties, as discussed above), actual detected past and present positions, as well as instantaneous dynamic states or properties of the entities in connection with determining possible future trajectories of entities within the monitored area. For example, based on tracking of the position of a person or machine within the monitored area up to the present time, vector generation component 210 can determine not only the historical locations of the person or machine from a recent past moment up to the present time (e.g., $H1\text{-}DP_1$, $H1\text{-}DP_2$, and $H1\text{-}DP_3$), but can also determine the present speed and acceleration of the person or machine. Vector generation component 210 can analyze this information in view of known upper limits on the speed and acceleration of the machine or vehicle as defined in the characteristic constraint data 606, which places limits on the future location, speed, and acceleration of the machine or object given its current location, speed, and acceleration. In this way, vector generation component 210 can limit possible predicted future locations of the machine or vehicle at a given future point in time (e.g., $H1\text{-}PP_1$) to only those locations at which the machine or object can possibly occupy at that future time given its current location, speed, and acceleration, where these possible locations are limited by the machine or object's maximum possible speed and acceleration.

In the example Human 1 vector $902_1$ illustrated in FIG. 10, vector generation component 210 has determined three possible future positions for Human 1 at future time $PP_1$, which are collectively labeled $H1\text{-}PP_1$. These predicted possible locations are based on the most recently detected actual position $H1\text{-}DP_3$, the overall trajectory up to the most recently detected position as determined based on previously detected positions $H1\text{-}DP_1$ and $H1\text{-}DP_2$, the current speed and acceleration of Human 1 as determined based on the rate of change of positions $H1\text{-}DP_1$ through $H1\text{-}DP_3$, and limits on how far Human 1 can travel in the duration between time $DP_3$ and time $PP_1$ given defined upper constrains on the speed and acceleration of Human 1. Vector generation component 210 can also consider characteristics of the monitored area itself when limiting the range of possible future positions of Human 1 at time $PP_1$, including known obstructions within the monitored area (e.g., walls, safety gates, etc.). Each possible future location H1-PP$_1$ of Human 1 represents a separate possible trajectory of Human 1 from the present time DP$_3$, three of which are represented in FIG. 10 by the three dotted lines that continue beyond position H1-DP$_3$.

For each possible location H1-PP$_1$ for Human 1 at future time PP$_1$, vector generation component 210 can further extrapolate one or more possible future positions H1-PP$_2$ of Human 1 at another future point in time PP$_2$ subsequent to time PP$_1$ using similar criteria as those used to determine H1-PP$_1$. Although FIG. 10 depicts each possible value of H1-PP$_1$ as having only a single corresponding subsequent value of H1-PP$_2$ for clarity, it some scenarios vector generation component 210 may estimate multiple possible subsequent positions H1-PP$_2$ at time PP$_2$ for each predicted possible value of H1-PP$_1$ (that is, there may be a 1-to-many relationship between a given future position at time PP$_N$ and its corresponding number of subsequent possible future positions at time PP$_{(N+1)}$. Vector generation component 210 can continue identifying subsequent possible future values of the position at sequential future times (e.g., PP$_3$, PP$_4$ . . . PP$_n$), thereby identifying multiple possible trajectory paths for each entity (e.g., human, machine, vehicle, etc.) within the monitored area.

Some future trajectories of vectors 902 may be determined to have a higher likelihood of occurring than others. Accordingly, vector generation component 210 may also assign a determined level of probability or certainty to each possible future trajectory. These probability levels can be used by hazard analysis component 212 to evaluate a level of risk of a hazardous interaction between two detected entities within the monitored collaborative industrial workspace at a future point in time. The hazardous interaction may be, for example, a collision between two entities (e.g., a human and a machine, or two machines) as indicated by a predicted intersection between two or more vectors 902 at a same future point in time. In some embodiments, a predicted intersection may be defined as a scenario in which the closest point of approach (CPA) for two vectors is less than a defined safe threshold.

To determine a probability level to be assigned to a given vector 902, vector generation component 210 can consider, among other factors, levels of certainty associated with individual predicted positions that make up the trajectory. For example, in general, the certainty of predicted future position values (e.g., predicted values of H1-PP$_1$ and H1-PP$_2$) tends to decrease as the future point in time being predicted extends farther from the present time. In the example depicted in FIG. 10, the predicted possible values of H1-PP$_2$ are likely to have a lower degree of certainty than those of H1-PP$_1$, since, for a series of predicted future values H1-PP$_1$ through H1-PP$_N$, uncertainty generally increases as a function of N.

Also, in some scenarios, for a given set of predicted possible positions corresponding to a same future point in time (e.g., the set of possible values of H1-PP$_2$ at time PP$_2$), some predicted position values may have a higher likelihood of being satisfied than others. For example, within a set of predicted position values for a given point of time PP$_N$, vector generation component 210 may assign a highest level of probability to a predicted future position that lies in the current trajectory of the entity being tracked, based on the assumption that the entity is more likely to maintain its current trajectory than to change trajectories. Under this assumption, vector generation component 210 may assign decreasing levels of probability or certainty to predicted position values for time PP$_N$ as the predicted positions deviate more from the current trajectory of the entity. Applying this assessment to the example trajectory 902$_1$ illustrated in FIG. 10, position 1004$_2$, which lies on an extrapolated future path of the current trajectory of Human 1, would be assigned a higher level of certainty than positions 1004$_1$ or 1004$_3$, which lie on extrapolated future paths that deviate from the current trajectory.

Other factors that maybe considered by the vector generation component 210 when assigning probabilities to predicted future positions can include, but are not limited to, the static and dynamic characteristic constraints defined in characteristic constraint data 606 (which may render some predicted future locations more likely than others given the physical constraints of the entities being tracked), known physical barriers within the monitored area, or other such information.

Figure 11:
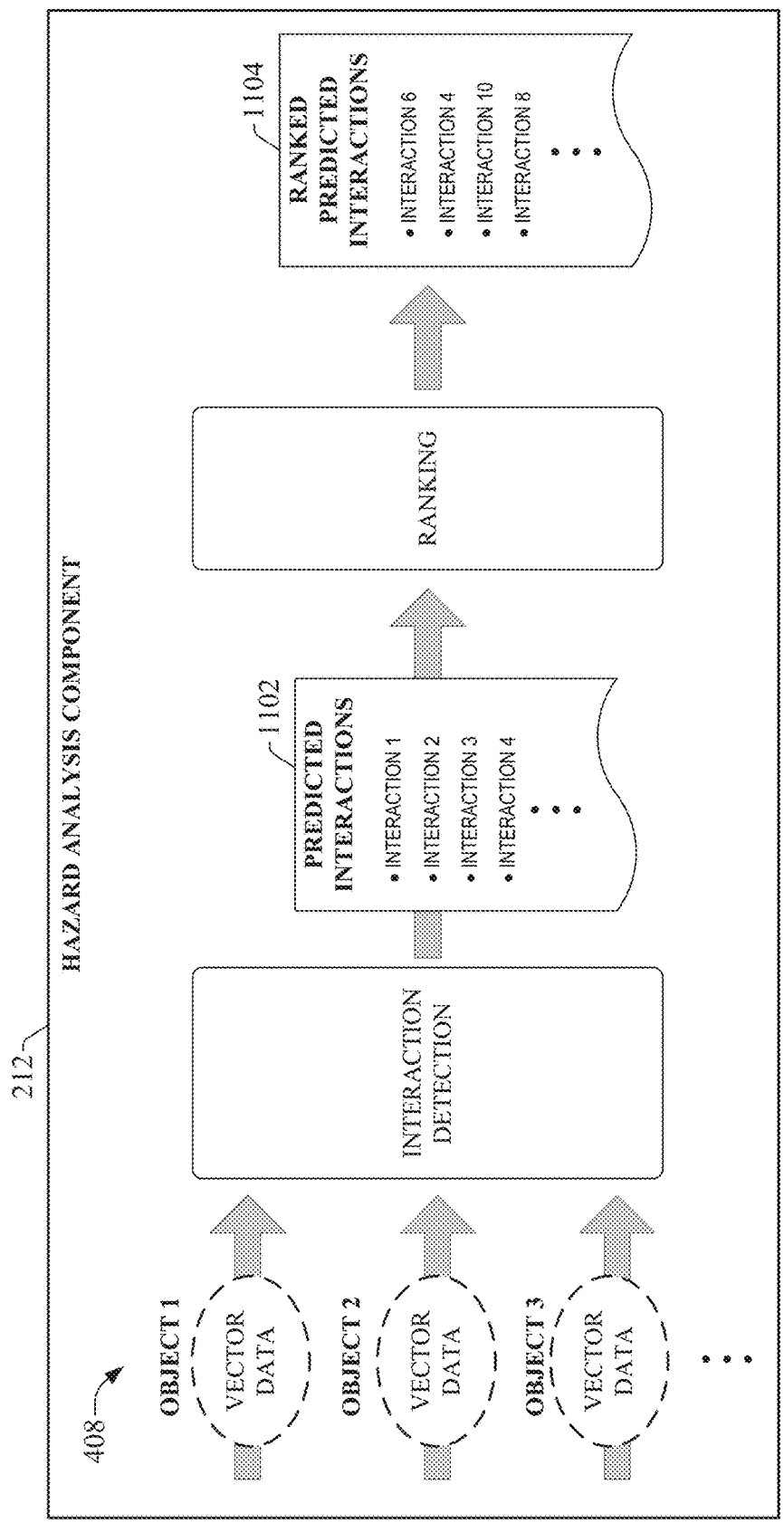
FIG. 11 is a diagram illustrating an example analysis that can be performed by a hazard analysis component of an example collaborative industrial workspace safety system to facilitate identification of possible future hazardous interaction within a monitored industrial area.

Hazard analysis component 212 can evaluate the vector data 408 and associated probabilities in order to identify possible hazardous interactions between any two of the entities detected within the monitored industrial area at a future point in time; e.g., based on a determined likelihood of that predicted future vectors 902 associated with respective two or more entities will cross a same location (or approximately the same location) at a same future point in time (or have a predicted CPA below a defined safe threshold). FIG. 11 is a diagram illustrating an example analysis that can be performed by hazard analysis component 212 to facilitate identification of possible future hazardous interaction within a monitored industrial area. In this example, hazard analysis component 212 can correlate all predicted future paths for the tracked entities represented by vector data 408 and identify scenarios in which two or more of the predicted paths corresponding to respective two tracked entities (humans, machines, vehicles, etc.) have a predicted closest point of approach (CPA) that is below a threshold indicative of a hazardous interaction between the two tracked entities. This yields a set of possible hazardous interactions 1102 within the monitored area predicted for a time frame ranging from the present time to a maximum time range represented by the vector data 408.

For each identified interaction, hazard analysis component 212 can identify the predicted time of the interaction (e.g., the time of closest point of approach (TCPA)), the entities involved in the interaction (based on which vectors 902 are involved in the interaction), a predicted severity of the interaction (e.g., based on identities of the entities involved, a current operating mode of a machine involved in the interaction, or other such factors), a probability that the interaction will occur (e.g., based on the levels of probability associated with the trajectories involved in the interaction, as determined by the vector generation component 210), or other such information characterizing the interaction. Hazard analysis component 212 can then rank these identified potential interactions based on any defined criteria to yield ranked predicted interactions 1104. For example, hazard analysis component 212 can rank the identified interactions according to one or more of a probability or certainty that the interaction will occur, a severity of the interaction, a time of the interaction, a predicted frequency of the interaction, or other such criteria.

Based on the rankings of the predicted interactions, hazard analysis component 212 can determine whether any of the predicted interactions necessitate generation of a control output 304 directed to a plant floor device in order to either mitigate the hazard or warn of the hazard. To this end, some embodiments of hazard analysis component 212 can classify each of the ranked interactions 1104 according to a level of intervention that may be required by the safety system 202 to mitigate the risk of harm to a person or damage to equipment that may result from the interaction. In an example classification scheme, hazard analysis component 212 may classify the ranked interaction according to a first level in which a dangerous interaction is imminent, a second level in which there is a likelihood (above a defined probability threshold) of a dangerous interaction that is not imminent but is within a specified reaction timeframe (that is, a timeframe that is sufficiently long such that the hazard can be avoided if one of the entities changes its present trajectory or speed), and a third level in which an the interaction is not anticipated to present a danger to personnel or equipment within a specified timeframe. Other numbers and types of classifications are also within the scope of one or more embodiments.

Returning to FIG. 6b, based on the ranked (and in some embodiments, classified) predicted interactions 1104, hazard analysis component 212 can determine whether any of the ranked interactions 1104 necessitate intervention by the safety system 202. Hazard analysis component 212 can use any suitable criteria to determine whether an intervention is necessary, and to identify a suitable type of intervention. For example, hazard analysis component 212 may determine that an intervention is necessary if any of the ranked predicted interactions 1104 exceed a defined intervention threshold for one or more of the following metrics—severity the interaction, a probability or certainty of the interaction, identities of the entities involved in the interaction, or other contextual or calculated information associated with the predicted interaction If an intervention is deemed necessary for one of the ranked predicted interactions 1104, hazard analysis component 212 can determine a type of safety intervention to be enacted in order to mitigate the hazardous interaction. The type of intervention can be a function of a number of factors identified by the hazard analysis component 212. For example, for a given type of hazardous interaction—e.g., a predicted hazardous interaction between a human and a moving industrial machine—the type of safety intervention initiated by safety system 202 may depend on the expected reaction time remaining for the interaction. That is, if the time of the closest point of approach (TCPA) for the interaction is sufficiently far into the future that the intervention can be avoided if the human or machine changes its current trajectory, hazard analysis component 212 can determine that sending a warning to the person may be sufficient to mitigate the risk of interaction. Accordingly, hazard analysis component 212 may select, as the safety intervention, delivery of a notification to the person via a personal device carried by the user or via an audio-visual warning device installed in the monitored area (e.g., a siren, a stack light, a recorded voice playback device, etc.). As an alternative to sending a notification, hazard analysis component 212 may elect to change the trajectory of the machine in order to mitigate the hazardous interaction. This can involve, for example, changing an operating mode of the machine, by changing a speed of the machine (e.g., switching to a slow operating mode), by instructing the machine to move to a safe location or position, by stopping the machine, etc.

If hazard analysis component 212 determines that the reaction time until the TCPA of the interaction is less than a time required to avoid the interaction merely by altering a trajectory of the human or machine, hazard analysis component 212 may intervene by stopping the machine immediately (e.g., by isolating power from the machine). In general, the type of intervention selected by hazard analysis component 212 can depend on the time remaining until the expected TCPA of the hazardous interaction, where the degree of intrusiveness of the interaction increases as an inverse function of the time remaining until the TCPA. In some embodiments, hazard analysis component 212 can be configured to dynamically calculate a safe distance between two entities involved in a hazardous or damaging interaction, where the safe distance is function of the expected reaction time required for one or both of the entities to prevent the interaction by either stopping or diverting a current trajectory of movement. This safe distance can be determined as a function of such metrics as the type of equipment involved, the current orientations and/or speeds of the entities, the current weight or payload on the entities, or other such factors. In some embodiments, the hazard analysis component 212 can compare the determined safe distance and/or its associated requisite reaction time with the time remaining until the expected TCPA, and set the degree of intrusiveness of the system's safety intervention based on a result of this comparison.

The type of safety intervention selected may further be a function of the degree of severity of the expected interaction. For example, if hazard analysis component 212 determines that the intervention poses no risk of human injury or damage to equipment, a less intrusive safety intervention may be selected (e.g., a switch to a slow operating mode) even if the TCPA is imminent. This can minimize machine downtime and productivity loss by avoiding the need to completely de-energize a machine in order to mitigate a low-severity interaction.

When a hazardous interaction requiring a safety intervention has been predicted and a suitable safety intervention has been selected, hazard analysis component 212 can convey the requested safety intervention as decision data 608 to industrial device interface component 214. In accordance with the decision data 608, industrial device interface component can generate a control output 304 directed to one or more industrial devices or client devices, where the control output 304 is designed to implement the safety intervention. Depending on the nature of the requested safety intervention and the type of device to which the control output 304 is directed, control output 304 can comprise a digital or analog electrical signal (e.g., a 4-20 mA signal, a 0-10 VDC signal, etc.) directed to an input of an industrial controller, motor drive, or other industrial device; a networked control instruction that writes a digital or analog value to a data tag or register of an industrial device to initiate a local change in the operation of the device (e.g., to change a setpoint value or other process variable, to set a control bit that alters an operating mode of a machine controlled by the device, etc.); a message directed to a personal client device associated with a detected person within the monitored industrial area; or other such control instruction. In some embodiments, industrial device interface component 214 can be configured to interface with a plant network (e.g., a control and information protocol network, and Ethernet/IP network, a safety network, etc.) and send control outputs to other devices over the network connection, or may be configured to send output signals via a direct hardwired connection.

Depending on instructions conveyed in the decision data 608, the control output 304 generated by industrial device interface component 214 may be configured to disconnect power from a monitored automation system or machine, place the system or machine in a safe mode (e.g., a slow operation mode), initiate a supplemental control action to a specific machine component with which a human or another machine is at risk of interacting (e.g., retracting a press, pusher, or other retractable component; modulating a motor's power or force, changing an acceleration or deceleration of a motor driven component; etc.), send a notification to one or more client devices to alert personnel that a person or object is at risk of a hazardous collision with industrial equipment, or perform other such safety actions.

Figure 12:
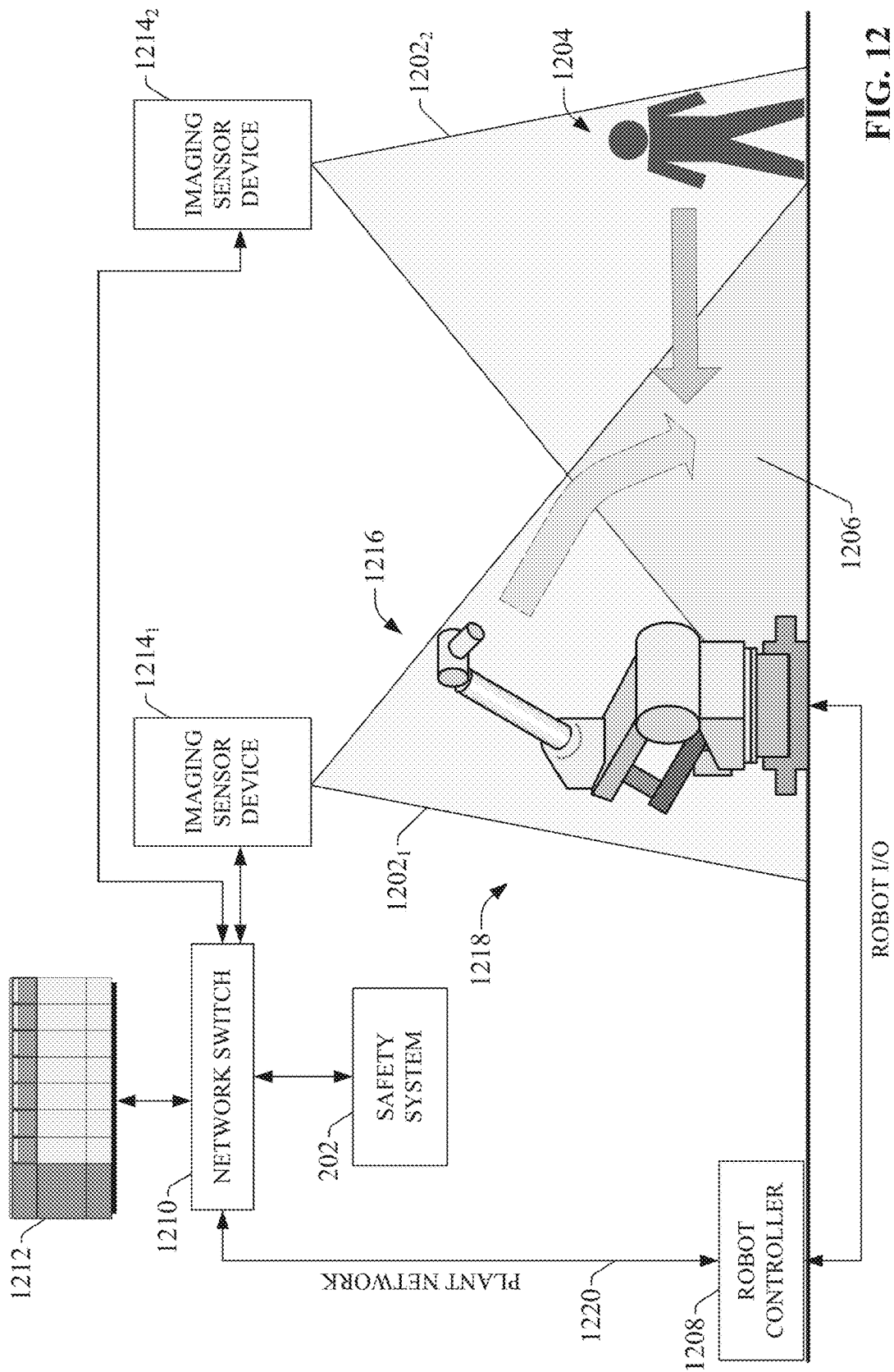
FIG. 12 is a view of an example control system that incorporates one or more embodiments of an example collaborative industrial workspace safety system.

FIG. 12 is a view of an example control system that incorporates one or more embodiments of safety system 202. In this non-limiting example, two imaging sensor devices $1214_1$ and $1214_2$ (e.g., 2D or 3D imaging sensors) are mounted such that the respective fields of view $1202_1$ and $1202_2$ of the imaging sensor devices $1214_1$ and $1214_2$ monitor two overlapping areas of a hazard industrial area 1218 within which an industrial robot 1216 operates. Robot 1216 is controlled by a robot controller 1208 that exchanges data with the robot 1216 via robot I/O. The robot 1216 operates as part of a larger automation system controlled by industrial controller 1212. Industrial controller 1212 and robot controller 1208 can exchange data via plant network 1220 and one or more network infrastructure devices (e.g., network switch 1210).

In this example, collaborative industrial workspace safety system 202 also reside on the plant network 1220. The safety system's input device interface component 204 receives sensor data from the imaging sensor devices $1214_1$ and $1214_2$, and this sensor data is processed by the object detection component 206, weighing component 208, and vector generation component 210 as described in previous examples. The viewing space monitored by the imaging sensor devices 1214 constitutes a safety zone within in which the locations and movements of objects and people will be detected and tracked by the safety system 202 so that the behavior of robot 1216 can be suitably altered in response to prediction of a potential hazardous interaction between robot 1216 and a human 1204 detected in the area 1218. Although the example system illustrated in FIG. 12 depicts only two sources of monitoring data (imaging sensor devices $1214_1$ and $1214_2$), other sensing devices, including devices of other sensing types, can also be networked to and analyzed by the safety system 202.

As described in previous examples, safety system 202 can identify objects represented by sensor data received from one or both of imaging sensor devices 1214, as well as the locations of the objects within the monitored area 1218. Objects or people located within the overlap zone 1206 between the two fields of view $1202_1$ and $1202_2$ will be identified in both sets of data from the respective two imaging sensor devise $1214_1$ and $1214_2$, and safety system 202 will assign a weight to each data source for a given object based on a determined level of accuracy or reliability of the information received from that data source, as described in previous examples. Additional location information—including both present and predicted future locations—of robot 1216 can also be obtained or estimated by the safety system 202 based on information read from robot controller 1208, which can convey the current operating mode or speed of the robot 1216, current position data for the robot 1216, or other information that can be used to predict the robot's future location. Similarly, additional location information for human 1204 can be obtained by safety system 202 from a personal location tracking device carried by the human 1204, if available. For each object detected in the sensor data received from the imaging sensor devices 1214 (or from other sources, such as robot controller 1208 and portable location tracking devices), safety system 202 aggregates the weighed sensor data for the object to yield historical trajectory information for the object. Safety system 202 also analyzes the past and present trajectory or behavior data represented by the aggregated weighed sensor data to determine a set of predicted future trajectories for the object, each of which is assigned a probability (or a set of probabilities) representing a relatively likelihood that the trajectory will be followed by the object.

As described above, safety system 202 can analyze the possible predicted trajectories to identify possible hazardous interaction—e.g., between robot 1216 and human 1204—and can rank the potential interactions according to such factors as a severity of the interaction (e.g., a degree of danger or potential harm to the human 1204), a likelihood of the interaction, a time until the interaction is expected to occur, or other such factors. If the safety system 202 determines that any of the predicted interactions requires a safety intervention, the safety system's industrial device interface component 214 can generate a control output 304 directed to a control device of the industrial system intended to mitigate the hazardous interaction. In the example system illustrated in FIG. 12, if safety system 202 determines that a predicted trajectory of robot 1216 and human 1204 have a likelihood of a closest point of approach that is below a threshold deemed to be safe, safety system 202 may send a control output to robot controller 1208 via plant network 1220 that places the robot 1216 in a safe state (e.g., by placing the robot in a stopped mode or a slow operating mode, or by otherwise altering the trajectory of the robot to avoid the trajectory of the human 1204). Safety system 202 may also send control instructions to industrial controller 1212 to control other machines or devices of the larger automation system in a manner that either warns human 1204 of the danger or further places the system in a safe state. For example, controller 1212 may control the illuminated states and siren of a stack light, or may control another type of notification device mounted near the robot 1216. Safety system 202 can send an instruction to controller 1212 via the plant network (e.g., via network switch 1210) to illuminate the stack light, activate the siren, or otherwise control a warning device to issue a warning to the human 1204.

In some embodiments, safety system 202 may have an associated visualization component 216 that visualizes safety analysis data generated by safety system 202 on a client device (e.g., a laptop computer, a desktop computer, a tablet computer, a mobile device, a wearable computer, etc.). Some embodiments of visualization component 216 can be configured to translate vector data 408 into graphical representations of the vectors 902—similar in format to trajectories illustrated in FIGS. 9 and 10—and to render these graphical trajectories on the client device. In an example format, each position point on these graphical trajectories can be color-coded based on a level of probability that the corresponding object, machine, or person will be at that position at the point in time represented by the position point. For example, past and present locations detected for the entity may be colored green to indicate a high level of certainty, while future predicted positions may be colored yellow for moderate certainty and red for relatively low certainty. In other embodiments, the color-coding may be based on a level of risk or threat associated with the corresponding position relative to the position of another entity.

Some embodiments of safety system 202 can also include reporting or auditing tools that maintain records of detected actual or predicted hazardous interactions. For example, hazard analysis component 212 can be configured to record statistics on the number, frequency, and severities of detected hazardous interactions, the number of times a safety intervention was required of the safety system 202 (which may be viewed on a per-machine basis), or other such statistics. In such embodiments, visualization component 216 can be configured to generate and display a variety of reports that render these risk and interaction statistics for a selected time period for auditing purposes.

Although the examples described above considered trajectories of physical locations of entities (e.g., machines, people, vehicles, etc.) within the collaborative industrial workspace in order to avoid collision-type hazardous interactions, some embodiments of safety system 202 can be configured to generate and track vectors of other types of hazardous events within the workspace. For example, based on the collected and weighed sensor data received from the plant floor sensors, safety system 202 may detect a toxic gas leak emanating from a faulty valve or broken pipe. Accordingly, vector generation component 210 may generate a multi-directional vector representing a diffusion of the gas within the atmosphere of the monitored industrial area. This vector can be based on a location of the source of the leak as well as a known diffusion rate of the gas and a measured pressure of the gas within the valve or pipe. Hazard analysis component 212 can correlate this diffusion vector with predicted location vectors of human personnel within the monitored area to determine a likelihood that any of the personnel will come into contact with the toxic gas as it diffuses through the atmosphere, and can instruct industrial device interface component 214 to initiate a safety intervention intended to mitigate the risk of exposure (e.g., by activating an alarm to warn the personnel, reducing the pressure on the gas line, activating fans that change the air flow rate to slow the diffusion of the gas, closing an automatic door to restrict the gas to a limited area, etc.). Other types of hazards that can be tracked by safety system 202 relative to locations of human personnel can include, but are not limited to, radiation leaks, fire or explosion hazards, dust contamination, parts that are ejected improperly by a machine, or other such hazards.

Figure 13A:
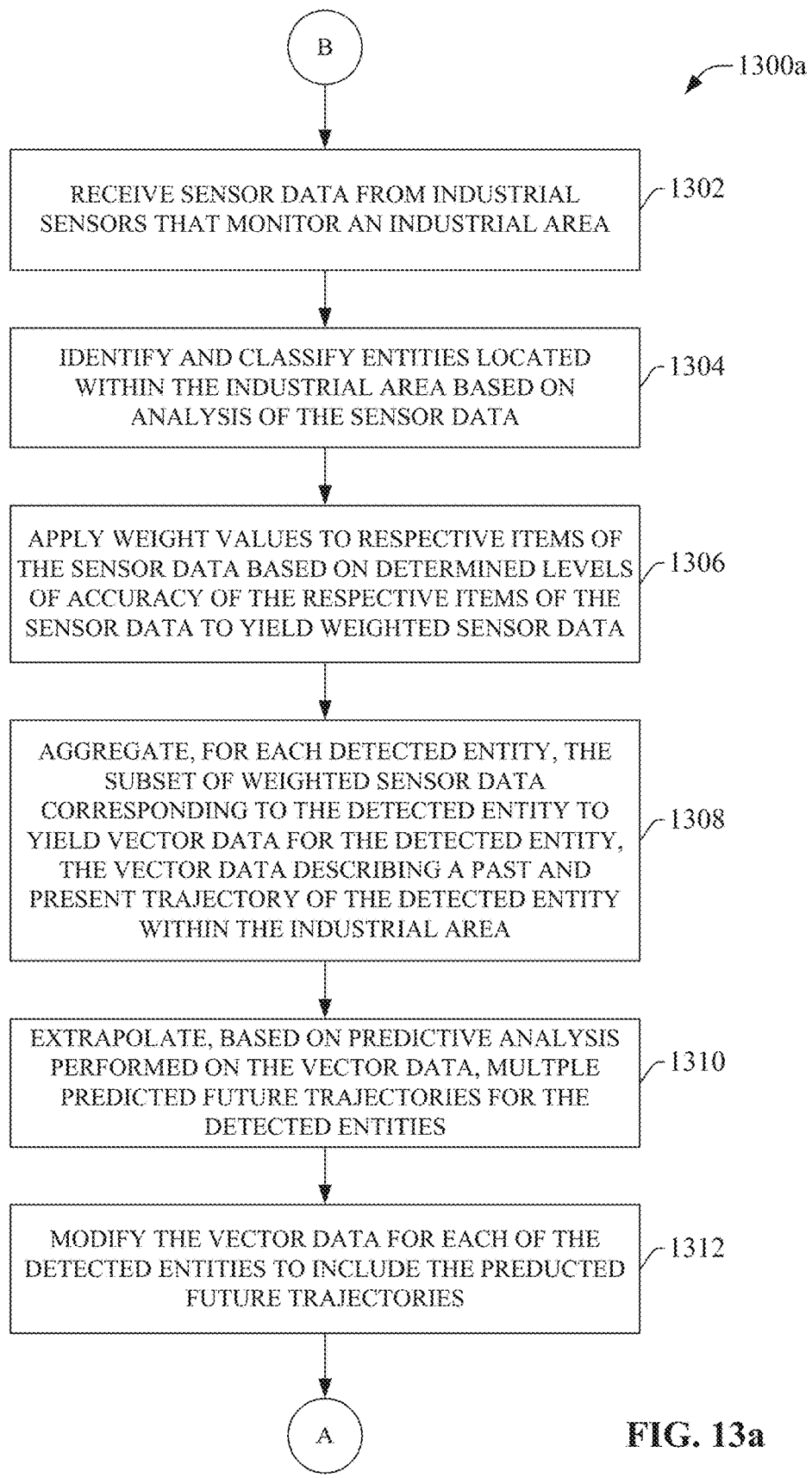
FIGS. 13a-13c are flowcharts of an example methodology for using measured sensor data to predict and mitigate hazardous interactions within a monitored industrial collaborative workspace.
Figure 13B:
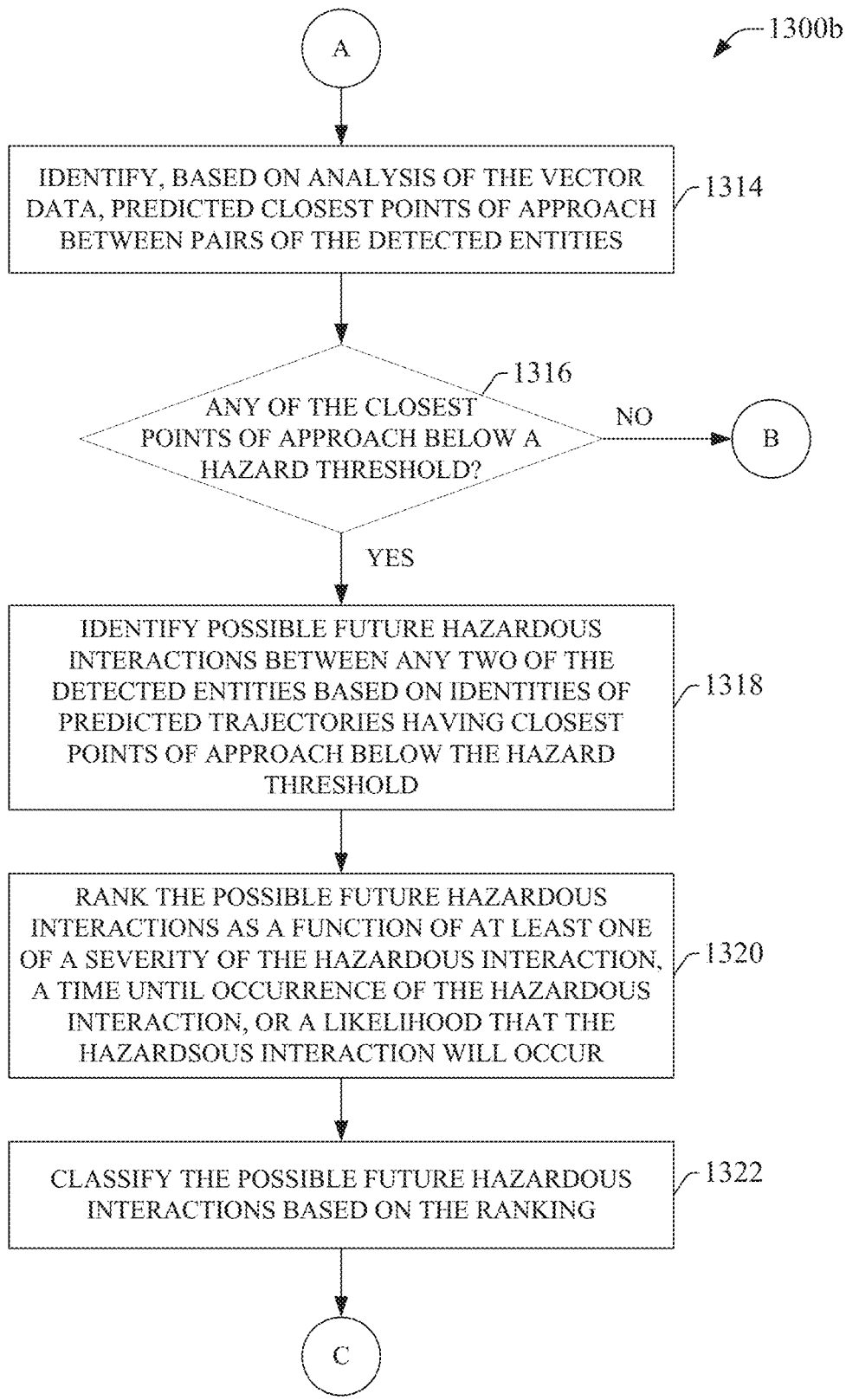
Figure 13C:
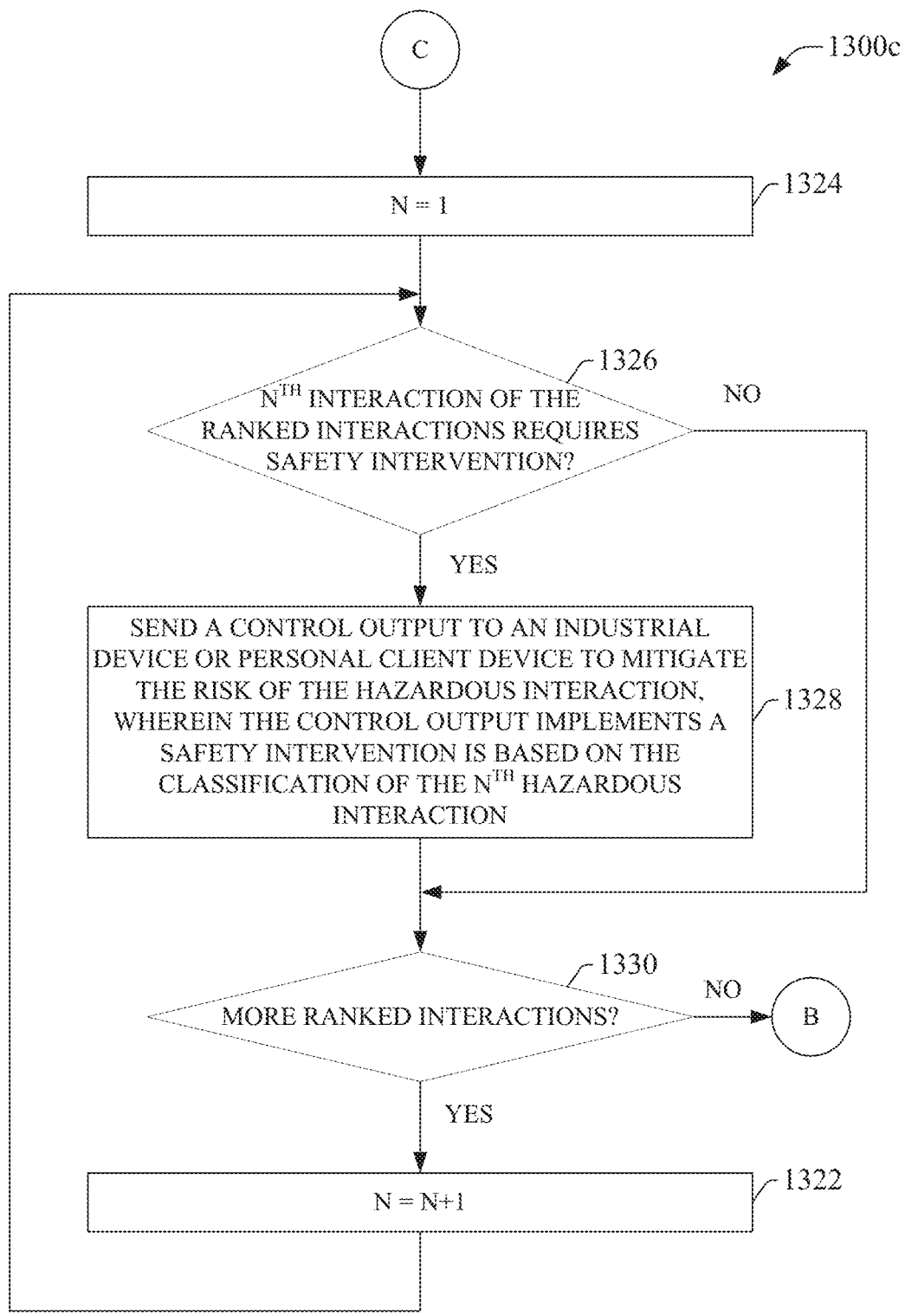

FIGS. 13a-13c illustrate a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13a illustrates a first part of an example methodology 1300a for using measured sensor data to predict and mitigate hazardous interactions within a monitored industrial collaborative workspace. Initially, at 1302, sensor data is received from industrial sensors that monitor a hazardous industrial area. The sensor data can be received from multiple disparate data sources, including but not limited to 3D imaging sensors such as TOF cameras, 2D imaging sensors, photo-detectors, laser scanners, telemetry devices (e.g., pressure meters, flow meters, temperature sensors, pressure sensors, etc.), or other such devices. At 1304, entities located within the industrial area are identified and classified based on analysis of the sensor data received at step 1302. Example entity classifications can include, but are not limited to, industrial machines or parts of machines, people, vehicles such as forklifts or trucks, or other such entities. In some embodiments, inherently hazardous events can also be detected based on analysis of the sensor data, including but not limited to toxic gas leaks, ejected parts, fire or explosion hazards, or other dangerous events.

At 1306, weight values are applied to respective items of the sensor data based on determined levels of accuracy of the respective items of the sensor data to yield weighed sensor data. The assumed level of accuracy for a given data source can be based on such factors as an operational state of the sensor providing the data (e.g., a fault condition on the sensor), a determination of whether the values reported by the sensor device are at an extreme end of the sensor's detection range, a detected atmospheric condition or other contextual condition in proximity of the sensor device that may impact the reliability of the sensor, a type of sensor device from which the data was received (e.g., a safety-rated or non-safety-rated device), or other such factors.

At 1308, for each entity detected at step 1304, the weighed sensor data corresponding to the detected entity is aggregated to yield vector data for the entity. The vector data describes a past and present location trajectory of the detected entity within the industrial area. At 1310, multiple predicted future trajectories of the detected entities are extrapolated based on predictive analysis performed on the vector data generated at step 1308. At 1312, the vector data generated at step 1308 for each detected entity is modified to include the predicted future trajectories extrapolated at step 1310. This yields vector data for each detected entity describing measured past and present locations and predicted possible future locations of each entity as a function of time. Each detected entity may include multiple predicted future trajectories from the present point in time, with each possible future trajectory ranked according to a likelihood that the detected entity will follow that trajectory.

The methodology then proceeds to the second part 1300b illustrated in FIG. 13b. At 1314, predicted closest points of approach between pairs of the detected entities are identified based on analysis of the modified vector data. At 1316, a determination is made as to whether any of the closest points of approach identified at step 1314 are below a hazard threshold indicative of a hazardous interaction between the two entities involved. If none of the identified closest points of approach are below the hazard threshold (NO at step 1316), the methodology returns to step 1302. Alternatively, if any of the closest points of approach are below the hazard threshold (YES at step 1316), the methodology proceeds to step 1318, where possible future hazardous interactions between any two of the detected entities are identified based on identities of the predicted trajectories having closest points of approach below the hazard threshold. At 1320, the possible future hazardous interactions identified at step 1318 are ranked as a function of at least one of a severity of the hazardous interaction, a time until occurrence of the hazardous interaction, or a likelihood that the hazardous interaction will occur.

At 1322, the possible future hazardous interactions are classified based on the ranking determined at step 1320. The classifications can include, but are not limited to, interactions that merit a warning to a detected human entity but do not merit altering a behavior of a machine, interactions that merit changing an operational state of a machine but do not merit stopping the machine completely, interactions that necessitate an immediate stopping of a machine, or other types of interaction classifications. The classifications can be based on such factors as a time of closest approach for the interaction, a severity of the interaction, or other such factors.

The methodology then proceeds to the third part 1300c illustrated in FIG. 13c. At 1324, a pointer N is set equal to 1. Pointer N is used to point to individual identified interactions as ranked in step 1320. At 1326, a determination is made as to whether an $N^{th}$ interaction of the ranked interactions requires a safety intervention. Interactions requiring a safety intervention can be identified based on the classifications established at step 1322. For example, interactions requiring a safety intervention can include interactions having a determined severity level that exceeds a threshold, interactions having a time of closest approach that is less than a defined threshold, interactions having a probability of occurring that exceeds a defined threshold, or other such factors (or combination of factors).

If the $N^{th}$ interaction does not require a safety intervention (NO at step 1316), the methodology returns to step 1302. Alternatively, if the $N^{th}$ interaction requires a safety intervention (YES at step 1326), the methodology proceeds to step 1328, where a control output is sent to an industrial device or personal client device that mitigates the risk of the hazardous interaction. The control output can be configured to implement a safety intervention that is selected based on the classification of the $N^{th}$ hazardous interaction. For example, if the classification defines that the hazardous interaction only requires a warning directed to human personnel, the control output may be a notification directed to a personal client device or a control signal directed to a warning device mounted within the monitored area. If the classification defines that the hazardous interaction requires a machine's behavior to be altered or stopped, the control output can be an instruction directed to an industrial controller or other industrial control device to implement the behavior change, or a control signal directed to a safety relay that causes power to be disconnected from the machine.

At 1330, a determination is made as to whether there are additional identified ranked interactions. If there are no more ranked interactions (NO at step 1330), the methodology returns to step 1302. Alternatively, if there are more ranked interactions (YES at step 1330), the methodology proceeds to step 1322, where pointer N is incremented, and steps 1326-1333 are repeated until all ranked interactions have been evaluated.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
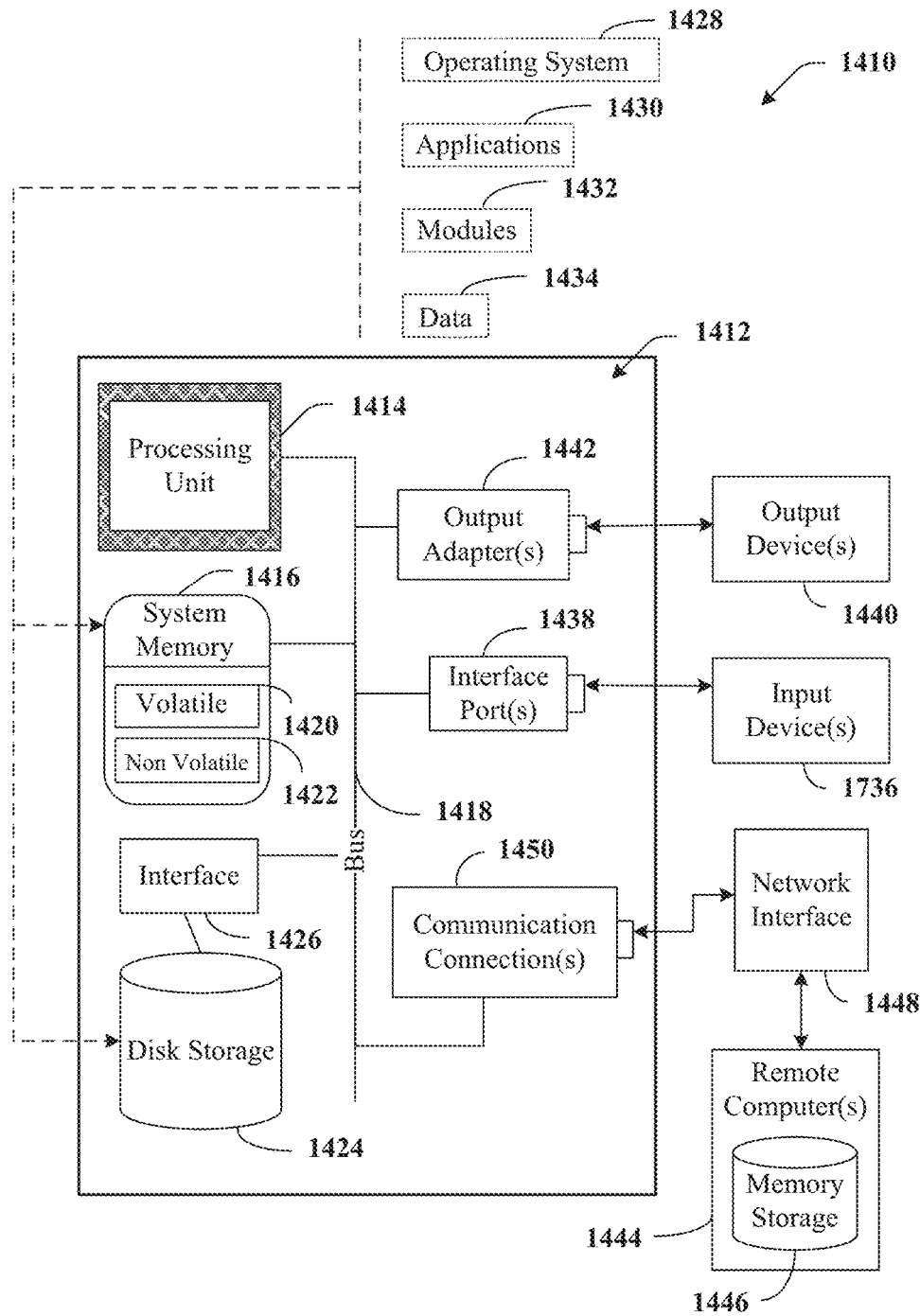
FIG. 14 is an example computing environment.
Figure 15:
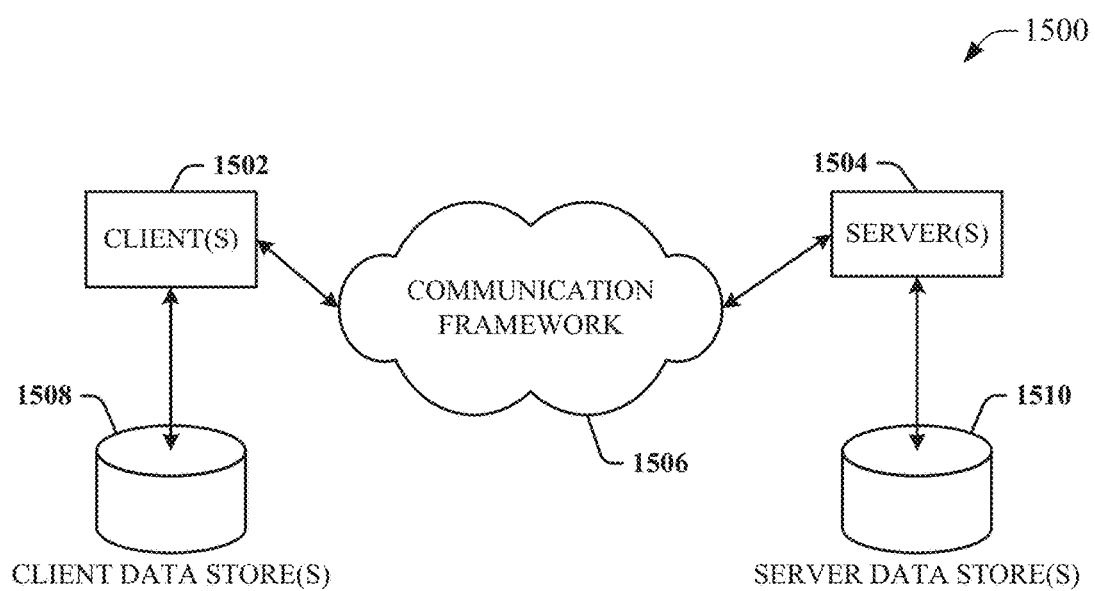
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented.

With reference to FIG. 14, an example environment 1410 for implementing various aspects of the aforementioned subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Multi-core microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable PROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer 1412. System applications 1430 take advantage of the management of resources by operating system 1428 through program modules 1432 and program data 1434 stored either in system memory 1416 or on disk storage 1424. It is to be appreciated that one or more embodiments of the subject disclosure can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapters 1442 are provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the system bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial safety system, comprising:
a memory that stores executable components;
a processor, operatively coupled to the memory, that executes the executable components, the executable components comprising:
an input device interface component configured to receive sensor data from industrial sensor devices, wherein the sensor data represents monitored characteristics of an industrial area;
an object detection component configured to identify, based on analysis of the sensor data, entities that are present within the industrial area, and to classify the entities according to two or more classifications, wherein the two or more classifications comprise at least a human entity and a hazardous entity;
a weighing component configured to, for each subset of the sensor data corresponding to an entity of the entities, apply a weight value to the subset of the sensor data indicative of a determined reliability of the subset of the sensor data to yield weighed sensor data;
a vector generation component configured to, for each entity of the entities,
aggregate subsets of the weighed sensor data corresponding to the entity to determine a measured trajectory of the entity within the industrial area, predict one or more future trajectories of the entity based on analysis of the measured trajectory and one or more constraints of the entity defined by characteristic constraint data, and
combine the measured trajectory and the one or more future trajectories to yield vector data for the entity;
a hazard analysis component configured to, based on analysis of first vector data corresponding to a first entity of the entities and second vector data corresponding to a second entity of the entities, predict a future hazardous interaction between the first entity and the second entity; and
an industrial device interface component configured to, in response to a determination that the future hazardous interaction satisfies a defined criterion, generate a control output signal directed to a device in the industrial area, wherein the control output signal is configured to at least one of notify at least one of the first entity or the second entity of the hazardous interaction or to modify a controlled behavior of at least one of the first entity or the second entity to mitigate the hazardous interaction.

2. The industrial safety system of claim 1, wherein the sensor devices comprise at least one of a two-dimensional imaging sensor, a three-dimensional camera, a laser scanner, a telemetry device, a photo-electric sensor, or a proximity switch.

3. The industrial safety system of claim 1, wherein the weighing component is configured to determine the weight value based on at least one of a measured atmospheric condition in proximity to an industrial sensor device, of the industrial sensor devices, that generated the subset of the sensor data; a determination of whether a measured value represented by the subset of the sensor data is near an extreme end of a measurable range of the industrial sensor device; a type of the industrial sensing device; a measured level of reflectivity of the entity, or a determination of whether the industrial sensor device is in a fault state.

4. The industrial safety system of claim 1, wherein the hazardous entity is at least one of an industrial machine, a portion of an industrial machine, a vehicle, a manufactured product, a toxic gas leak, a radiation leak, an explosion, a fire, or a hazardous noise level.

5. The industrial safety system of claim 1, wherein the one or more constraints of the entity comprise at least one of a speed limit of the entity, an acceleration limit of the entity, a deceleration limit of the entity, a weight of the entity, an operating mode of the entity, a diffusion rate of the entity, an inertia of the entity, or a coefficient of friction of the entity.

6. The industrial safety system of claim 1, wherein
the hazard analysis component is further configured to assign a classification to the future hazardous interaction as a function of one or more characteristics of the future hazardous interaction,
the one or more characteristics comprise at least one of a severity of the future hazardous interaction, a time of closest approach of the future hazardous interaction, or a likelihood that the future hazardous interaction will occur, and
the industrial device interface component is further configured to generate the control output signal and select the device for receipt of the control output signal based on the classification of the future hazardous interaction.

7. The industrial safety system of claim 1, wherein the industrial device interface component is configured to generate the control output signal to cause the device to at least one of disconnect power from the hazardous entity, place the hazardous entity in a slow operating mode, alter a trajectory of the hazardous entity, or issue an audible warning or a visual warning.

8. The industrial safety system of claim 1, further comprising a visualization component configured to render graphical representations of the vector data on a client device.

9. The industrial safety system of claim 8, wherein the visualization component is further configured to generate a ranking of multiple future hazardous interactions, including the future hazardous interactions, as a function of one or more characteristics of the future hazardous interactions, wherein the one or more characteristics comprise at least one of severities of the future hazardous interactions, times of closest approach of the future hazardous interactions, or likelihoods that the future hazardous interactions will occur, and color-code the graphical representations of the vector data based on the ranking.

10. A method for mitigating predicted industrial hazards, comprising:
receiving, by a system comprising a processor, sensor data from industrial sensor devices that monitor for presence of entities within an industrial area;
identifying, by the system based on an analysis of the sensor data, entities that are present within the industrial area;
classifying, by the system, the entities according to two or more classifications, wherein the two or more classifications comprise at least a human entity and a hazardous entity;
applying, by the system for each subset of the sensor data corresponding to an entity of the entities, a weight value to the subset of the sensor data representing a determined accuracy of the subset of the sensor data to yield weighed sensor data;
for each entity of the entities:
determining, by the system, a measured trajectory of the entity within the industrial area based on an aggregation of subsets of the weighted sensor data corresponding to the entity;
predicting, by the system, one or more future trajectories of the entity based on analysis of the measured trajectory and one or more constraints of the entity defined by characteristic constraint data; and
combining, by the system, the measured trajectory and the one or more future trajectories to yield vector data for the entity;
predicting, by the system, a future hazardous interaction between a first entity of the entities and a second entity of the entities based on analysis of first vector data corresponding to the first entity and second vector data corresponding to the second entity; and
in response to determining that the future hazardous interaction satisfies a defined criterion, generating, by the system, a control output signal directed to a device in the industrial area,
wherein the control output signal is configured to at least one of notify at least one of the first entity or the second entity of the hazardous interaction or to initiate a change of a controlled behavior of at least one of the first entity or the second entity to mitigate the hazardous interaction.

11. The method of claim 10, wherein the receiving comprises receiving the sensor data from at least one of a two-dimensional imaging sensor, a three-dimensional camera, a laser scanner, a telemetry device, a photo-electric sensor, or a proximity switch.

12. The method of claim 10, wherein the applying the weight value comprises determining the weight value based on at least one of a measured atmospheric condition in proximity to an industrial sensor device, of the industrial sensor devices, that generated the subset of the sensor data; a determination of whether a measured value represented by the subset of the sensor data is near an extreme end of a measurable range of the industrial sensor device; or a determination of whether the industrial sensor device is in a fault state.

13. The method of claim 10, wherein the hazardous entity is at least one of, an industrial machine, a portion of an industrial machine, a vehicle, a manufactured product, a toxic gas leak, a radiation leak, an explosion, a fire, or a hazardous noise level.

14. The method of claim 10, wherein the predicting the one or more future trajectories of the entity comprises predicting the one or more future trajectories based on, as the one or more constraints, at least one of a speed limit of the entity, an acceleration limit of the entity, a deceleration limit of the entity, a weight of the entity, an operating mode of the entity, a diffusion rate of the entity, an inertia of the entity, or a coefficient of friction of the entity.

15. The method of claim 10, further comprising:
assigning, by the system, a classification to the future hazardous interaction based on one or more characteristics of the future hazardous interaction, wherein the one or more characteristics comprise at least one of a severity of the future hazardous interaction, a time of closest approach of the future hazardous interaction, or a likelihood that the future hazardous interaction will occur,
wherein the generating the control output signal comprises generating the control output signal based on the classification of the future hazardous interaction.

16. The method of claim 10, wherein the generating the control output signal comprises generating the control output signal to cause the device to at least one of disconnect power from the hazardous entity, place the hazardous entity in a slow operating mode, alter a trajectory of the hazardous entity, or issue an audible warning or a visual warning.

17. The method of claim 10, further comprising rendering, by the system, graphical representations of the vector data for the entities on a client device.

18. A non-transitory computer-readable medium having stored thereon instructions that, in response to execution, cause a system comprising a processor to perform operations, the operations comprising:
receiving, from industrial sensor devices, sensor data representing monitored characteristics of an industrial area;
identifying, based on an analysis of the sensor data, entities within the industrial area;
classifying the entities according to at least two classifications, wherein the at least two classifications comprise at least a human entity and a hazardous entity;
for each subset of the sensor data corresponding to an entity of the entities, assigning a weight value to the subset of the sensor data to yield weighed sensor data, the weight value representing a determined reliability of the subset of the sensor data;
for each entity of the entities:
aggregating subsets of the weight sensor data corresponding to the entity to yield a measured trajectory of the entity within the industrial area;
predicting one or more future trajectories of the entity based on analysis of the measured trajectory and one or more constraints of the entity defined by characteristic constraint data; and
combining the measured trajectory and the one or more future trajectories to yield vector data for the entity;
predicting a future hazardous interaction between a first entity of the entities and a second entity of the entities based on analysis of first vector data corresponding to the first entity and second vector data corresponding to the second entity; and in response to determining that the future hazardous interaction satisfies a defined criterion, generating a control output signal directed to a device within the industrial area, wherein the control output signal is configured to at least one of notify at least one of the first entity or the second entity of the hazardous interaction or to alter a controlled behavior of the at least one of the first entity or the second entity to mitigate the hazardous interaction.

19. The non-transitory computer-readable medium of claim 18, wherein the assigning the weight value comprises determining the weight value based on at least one of a measured atmospheric condition in proximity to an industrial sensor device, of the industrial sensor devices, that generated the subset of the sensor data; a determination of whether a measured value represented by the subset of the sensor data is near an extreme end of a measurable range of the industrial sensor device; or a determination of whether the industrial sensor device is in a fault state.

20. The non-transitory computer-readable medium of claim 18, wherein the operations further comprise:

assigning a classification to the future hazardous interaction based on one or more characteristics of the future hazardous interaction, wherein the one or more characteristics comprise at least one of a severity of the future hazardous interaction, a time of closest approach of the future hazardous interaction, or a likelihood that the future hazardous interaction will occur, wherein the generating the control output signal comprises generating the control output signal based on the classification of the future hazardous interaction.

* * * * *